United States Patent
Jimenez

(10) Patent No.: US 11,852,258 B2
(45) Date of Patent: Dec. 26, 2023

(54) SYSTEMS AND METHODS FOR PURGING AN ISOLATION VALVE WITH A LIQUID PURGE MEDIUM

(71) Applicant: TapcoEnpro, LLC, Channelview, TX (US)

(72) Inventor: Filiberto Jimenez, Channelview, TX (US)

(73) Assignee: TapcoEnpro, LLC, Channelview, TX (US)

( * ) Notice: Subject to any disclaimer, the term of this patent is extended or adjusted under 35 U.S.C. 154(b) by 0 days.

(21) Appl. No.: 17/139,366

(22) Filed: Dec. 31, 2020

(65) Prior Publication Data

US 2022/0204865 A1 Jun. 30, 2022

(51) Int. Cl.
| | |
|---|---|
| *F16K 3/20* | (2006.01) |
| *C10G 7/12* | (2006.01) |
| *B01D 3/14* | (2006.01) |
| *B08B 9/032* | (2006.01) |
| *C10G 11/18* | (2006.01) |
| *C10G 55/06* | (2006.01) |
| *B01D 3/42* | (2006.01) |
| *F16K 3/02* | (2006.01) |

(52) U.S. Cl.
CPC ............... *F16K 3/207* (2013.01); *B01D 3/14* (2013.01); *B01D 3/4283* (2013.01); *B08B 9/0321* (2013.01); *C10G 7/12* (2013.01); *C10G 11/182* (2013.01); *C10G 55/06* (2013.01); *B08B 2209/032* (2013.01); *F16K 3/0281* (2013.01)

(58) Field of Classification Search
CPC ...... F16K 3/0236; F16K 3/0227; F16K 3/207; F16K 3/20; F16K 25/02; C10G 7/12; C10G 11/182; C10G 55/06; B01D 3/14; B01D 3/4283; B08B 9/0321; B08B 2209/032; C10B 25/10
See application file for complete search history.

(56) References Cited

U.S. PATENT DOCUMENTS

| | | | | |
|---|---|---|---|---|
| 2,525,989 | A * | 10/1950 | Works | F16K 3/0227 251/172 |
| 2,777,664 | A * | 1/1957 | Bryant | F16K 3/0236 251/174 |
| 3,000,608 | A * | 9/1961 | Williams | F16K 3/0281 251/170 |
| 3,145,969 | A * | 8/1964 | Von Zweck | F16K 51/02 251/172 |

(Continued)

FOREIGN PATENT DOCUMENTS

| | | | | |
|---|---|---|---|---|
| FR | 1379789 A * | 11/1964 | ............. | F16K 3/207 |
| WO | WO-9825057 A2 * | 6/1998 | ............. | F16K 3/207 |

*Primary Examiner* — David Colon-Morales
(74) *Attorney, Agent, or Firm* — Dax D. Anderson; Kirton McConkie

(57) ABSTRACT

An isolation valve purge system for an isolation valve, with internal components configured to isolate the flow of process fluid through the bottom slurry circuit line. In some embodiments the isolation valve is purged using a liquid purge medium created in the fractionation tower, such as a hydrocarbons, oils of different viscosity or a combination of hydrocarbons. A method for reducing cavitation in a pressurized line by using a hydrocarbon from the fractionation tower to purge an isolation valve process fluid flowing therethrough with a liquid purge medium.

19 Claims, 16 Drawing Sheets

(56) References Cited

U.S. PATENT DOCUMENTS

| | | | | |
|---|---|---|---|---|
| 3,204,924 | A * | 9/1965 | Bredtschneider | F16K 5/207 251/174 |
| 3,233,862 | A * | 2/1966 | Marsh | F16K 5/207 251/172 |
| 4,163,458 | A * | 8/1979 | Bachmann | F16K 3/207 137/240 |
| 4,208,035 | A * | 6/1980 | Alvarez | F16K 3/0236 251/196 |
| 4,217,923 | A * | 8/1980 | Kindersley | F16K 5/0636 137/315.21 |
| 4,278,236 | A * | 7/1981 | Janich | F16K 3/207 251/159 |
| 4,292,992 | A * | 10/1981 | Bhide' | F16K 25/02 137/340 |
| 4,513,947 | A * | 4/1985 | Amend | F16K 3/20 251/159 |
| 4,562,992 | A * | 1/1986 | Sugisaki | F16K 3/207 251/159 |
| 4,747,578 | A * | 5/1988 | Kivipelto | F16K 5/207 251/159 |
| 4,909,272 | A * | 3/1990 | Carpentier | F16K 3/0281 134/166 C |
| 5,137,261 | A * | 8/1992 | Clifford | F16K 3/0281 251/328 |
| 5,290,072 | A * | 3/1994 | Pechacek | C10B 25/10 285/106 |
| 5,538,623 | A | 7/1996 | Johnson | |
| 5,607,165 | A * | 3/1997 | Bredemeyer | F16K 41/003 277/320 |
| 5,789,636 | A * | 8/1998 | Holighaus | C10B 57/06 585/241 |
| 5,917,102 | A * | 6/1999 | Holighaus | C10B 53/07 585/241 |
| 6,565,714 | B2 * | 5/2003 | Lah | C10B 25/10 202/242 |
| 6,660,131 | B2 * | 12/2003 | Lah | C10B 1/04 202/242 |
| 6,919,017 | B2 * | 7/2005 | Annesley | C10G 9/005 208/50 |
| 7,115,190 | B2 * | 10/2006 | Lah | B01D 17/0214 201/25 |
| 7,316,762 | B2 * | 1/2008 | Lah | C10B 25/10 202/242 |
| 7,426,936 | B2 * | 9/2008 | Gessaman | F16J 15/004 137/312 |
| 7,484,710 | B2 * | 2/2009 | Koester | F16K 5/0678 251/160 |
| 7,682,460 | B2 * | 3/2010 | Ferrara | C11D 11/0041 134/10 |
| 8,123,197 | B2 * | 2/2012 | Lah | F16K 27/044 251/327 |
| 8,282,074 | B2 * | 10/2012 | Lah | F16K 3/0272 251/327 |
| 8,459,608 | B2 * | 6/2013 | Lah | F16K 3/0236 251/328 |
| 8,794,593 | B2 * | 8/2014 | Kahn | F16K 3/0227 251/328 |
| 9,505,982 | B2 * | 11/2016 | Lah | F16K 3/02 |
| 9,784,373 | B2 * | 10/2017 | Puetz | F16K 31/1225 |
| 9,963,641 | B2 * | 5/2018 | Keusenkothen | B01J 8/0492 |
| 10,359,113 | B2 * | 7/2019 | Bergamini | F16J 15/48 |
| 10,655,070 | B2 * | 5/2020 | Wheeler | B01J 8/0055 |
| 10,676,673 | B2 * | 6/2020 | Voorhees | F16K 27/044 |
| 10,786,838 | B2 * | 9/2020 | Decker | B08B 9/00 |
| 11,041,569 | B2 * | 6/2021 | Krause | F16K 3/312 |
| 2004/0045803 | A1 | 3/2004 | Lah | |
| 2005/0269197 | A1 * | 12/2005 | Beala | F16K 3/06 202/245 |
| 2007/0034489 | A1 | 2/2007 | Lah | |
| 2007/0251576 | A1 * | 11/2007 | Lah | C10B 25/10 137/15.06 |
| 2009/0032439 | A1 | 2/2009 | Couch | |
| 2015/0368567 | A1 * | 12/2015 | Wheeler | C10G 1/02 201/2.5 |
| 2015/0376509 | A1 * | 12/2015 | Etter | C10G 11/00 208/109 |
| 2016/0264886 | A1 | 9/2016 | Davydov | |
| 2020/0347943 | A1 * | 11/2020 | Krause | C10B 43/06 |

\* cited by examiner

SYSTEMS AND METHODS FOR PURGING AN ISOLATION VALVE WITH A LIQUID PURGE MEDIUM

CROSS-REFERENCE TO RELATED APPLICATIONS

This application does not assert a priority claim.

TECHNICAL FIELD

The present disclosure relates generally to the purging of isolation valves. More particularly, the disclosure relates to using hydrocarbons distilled in a fractionation tower as a liquid purge medium in isolation valves.

BACKGROUND

Isolation valves control the flow of potentially destructive process fluids. To prevent fluids from leaving the line and entering the valve body or bonnets, a purge medium under a positive pressure ensures the process fluid does not leave the line. Gasses such as steam and nitrogen are often used as the purge media. However, purging with gas changes the density of the process fluids and can lead to cavitation in slurry pumps.

BRIEF SUMMARY

The general purpose of the systems and methods disclosed herein is to improve isolation valve purging. Specifically, in some embodiments where multiple distillation columns or fractionators and slurry pump systems are present in a refinery, each fractionator has circuits isolated by an isolation valve. The present invention comprises an isolation valve purge system for an isolation valve, with internal components configured to isolate the flow of process fluid through the bottom slurry circuit line. In some embodiments the isolation valve is purged using a liquid purge medium created in the fractionation tower, such as a hydrocarbons, oils of different viscosity, or a combination of hydrocarbons.

Some embodiments comprise a method for reducing cavitation in a pressurized line. Some embodiments comprise purging an isolation valve controlling a line with process fluid flowing therethrough with a liquid purge medium.

Reference throughout this specification to features, advantages, or similar language does not imply that all of the features and advantages that may be realized with the present disclosure should be or are in any single embodiment of the invention. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment, but may refer to every embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The features and advantages of the present disclosure will become more fully apparent from the following description and appended claims or may be learned by the practice of the invention as set forth hereinafter.

BRIEF DESCRIPTION OF THE DRAWINGS

In order to describe the manner in which the advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
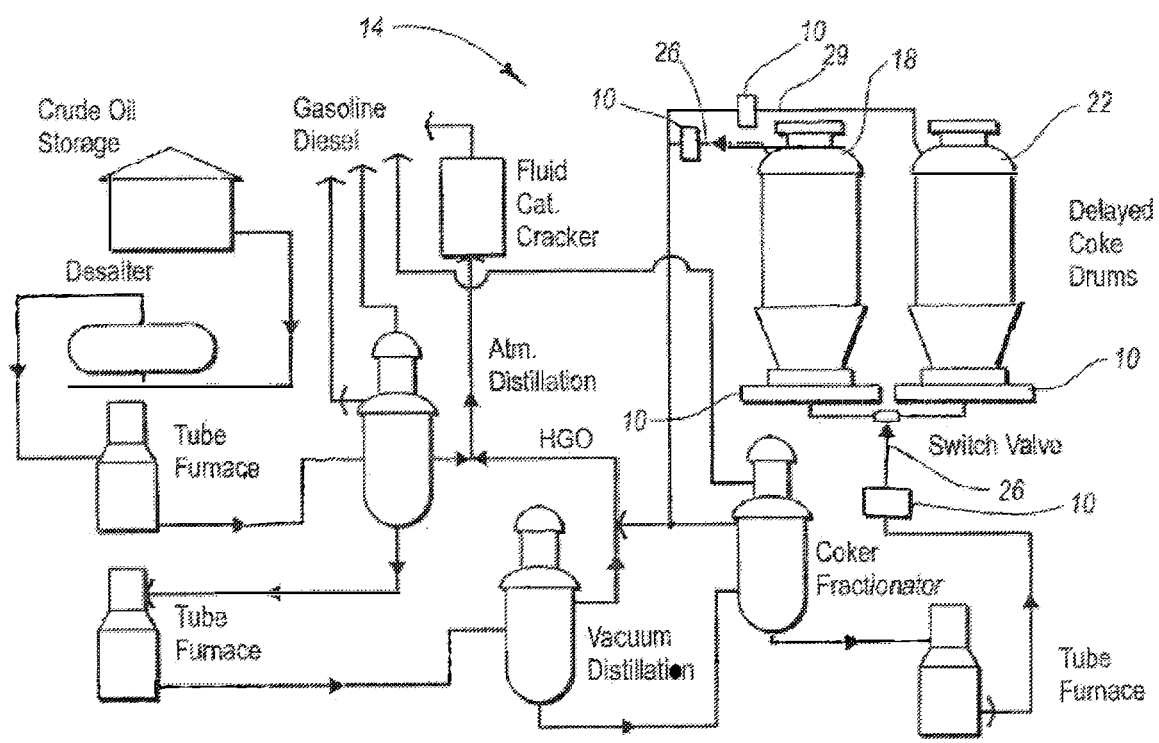
FIG. 1 illustrates a process.

The present embodiments of the present disclosure will be best understood by reference to the drawings, wherein like parts are designated by like numerals throughout. It will be readily understood that the components of the disclosed invention, as generally described and illustrated in the figures herein, could be arranged and designed in a wide variety of different configurations. Thus, the following more-detailed descriptions of the embodiments of the apparatus, as represented in FIGS. 3A-11, are not intended to limit the scope of the invention, as claimed, but are merely representative of present embodiments of the invention.

In some embodiments of the invention, which may be implemented at a refinery or plant, an isolation valve is purged using a purge medium refined at the refinery or plant, such as hydrocarbons distilled in a fractionator. In some embodiments, the fractionator distills crude feed into component parts of heavy coker oils (HCO), medium coker oils (MCO) and light coker oils (LCO), as well as into other fuels and gases, and into a bottom product oil from the a main fractionator referred to as a slurry oil. Slurry oil may contain a residual entrained catalyst associated with Fluid Catalytic Cracking and entrained coke particles associated with de-coking operations. In some embodiments, part of the slurry oil is recycled back into the main fractionator above an entry point for hot reaction product vapors, so as to cool and partially condense the reaction product vapors as they enter the main fractionator. In some embodiments, part of the slurry oil is pumped through a slurry settler. A bottom oil from the slurry settler contains most of the slurry oil catalyst particles and is recycled back into a catalyst riser, combined with FCC feedstock oil. This results in a clarified slurry fluid, also called slurry oil or decant oil, which is withdrawn from the top of slurry settler for use elsewhere in the refinery, use as a heavy fuel oil blending component, or use as carbon black feedstock. The flow of this slurry oil in a slurry circuit is controlled by an isolation valve. Slurry oil is the oil most likely to leave deposits inside a valve, damaging the valve. In some embodiments, the HCO, MOC, LCO, or a combination of the oils is maintained under positive pressure greater than the pressure of the line so as to purge such an isolation valve. When used as a purge medium, a small amount of purge medium typically enters the process fluid through imperfect seals between the metal-on-metal surfaces in the valve. However, because the purge medium used in some embodiments of the present invention is oil (comprised of hydrocarbons), and a percentage of the slurry in the line is made up of hydrocarbons, the purge medium of the present invention does not contaminate the slurry.

The addition of liquid hydrocarbons to the slurry prevents cavitation in the pumps which pump the slurry through the bottom slurry circuit. In prior art circuits, gas leaking past the valve seats can cause rapid changes of pressure in a process fluid and lead to the formation of small vapor-filled cavities in places where the pressure is relatively low. Cavitation is not good for the pumps, and in some instances can damage the pumps. Using a liquid instead of a gas as a purge media avoids these problems.

Detailed references will now be made to the embodiments of the disclosed invention, examples of which are illustrated in FIGS. 3A-11, which illustrate various views of a valve with liquid media purge ports in accordance with one or more embodiments of the invention.

General Discussion on the Refining Process

Refining processes such as fluidic catalytic cracking and other refining processes may involve extreme pressures and temperatures. Isolation valves used in refining plants include internal components, which maintain the valve seal despite the extreme temperatures and pressures.

Figure 2A:
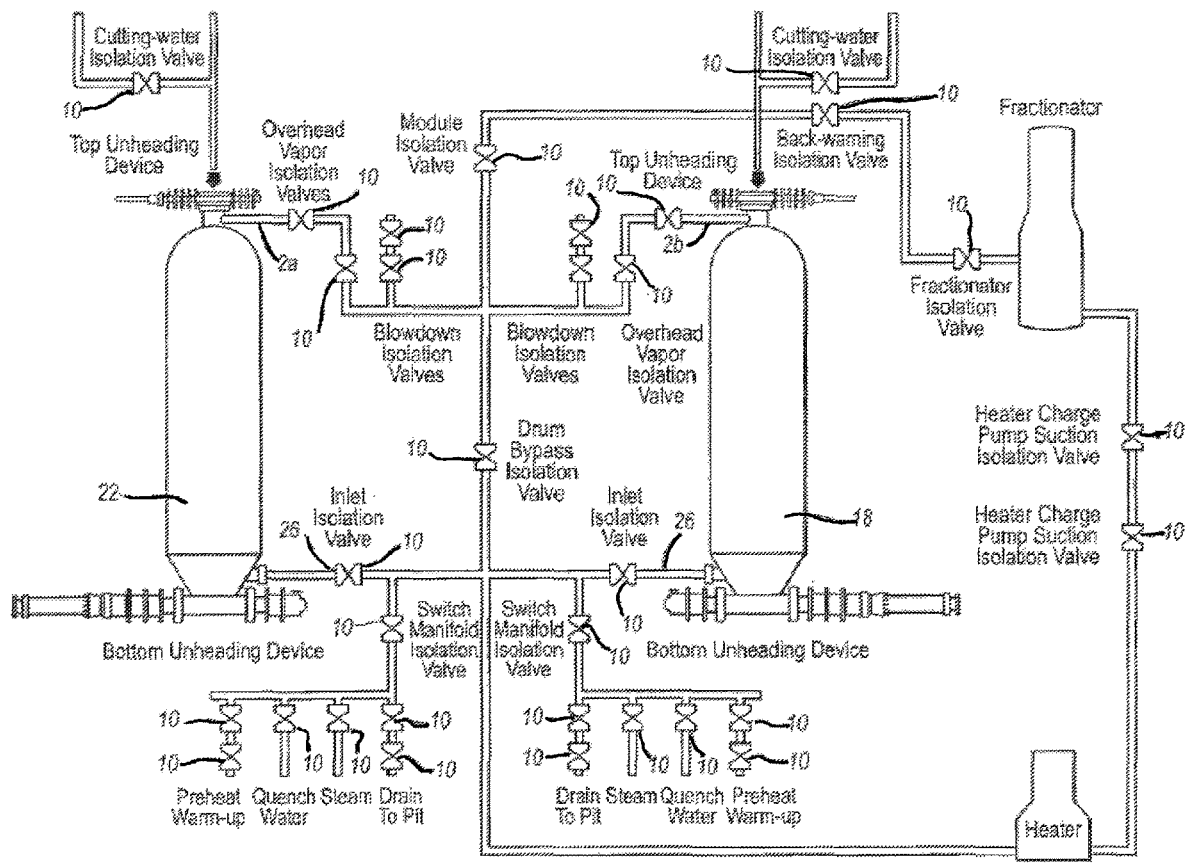
FIGS. 2A-2C illustrate an exemplary operation and identify several potential positions for an isolation valve according to some embodiments.
Figure 2B:
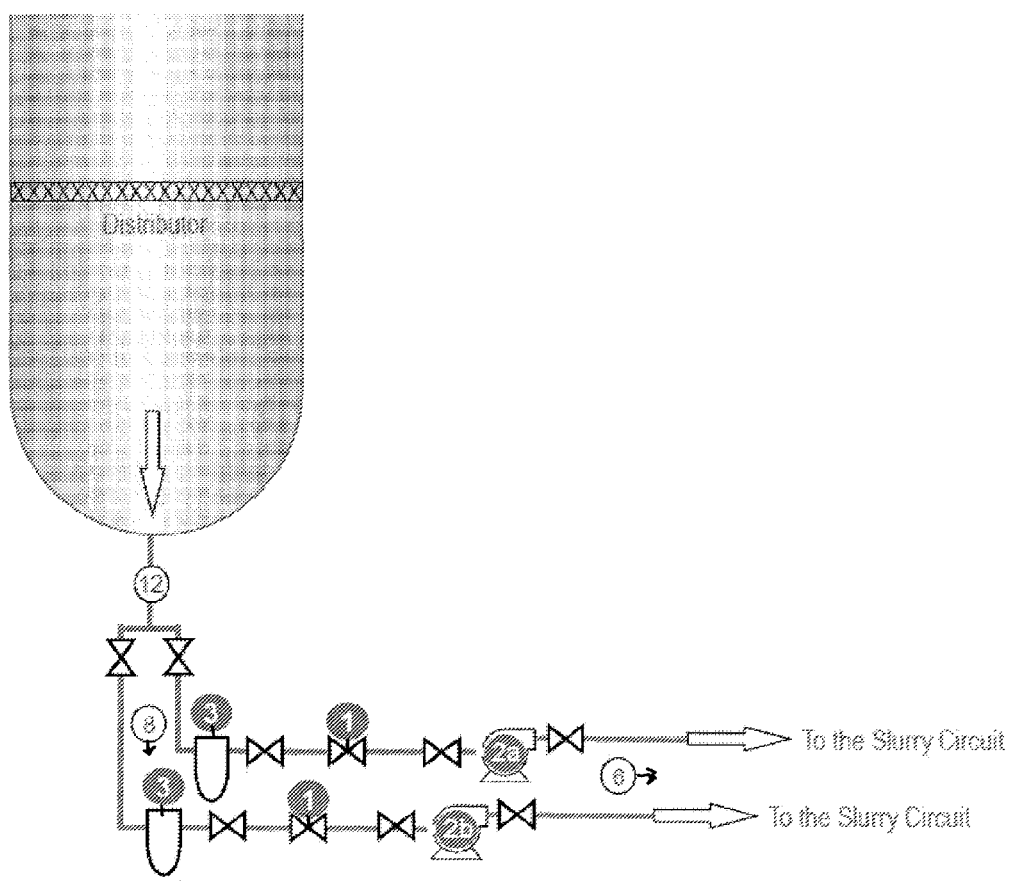
Figure 2C:
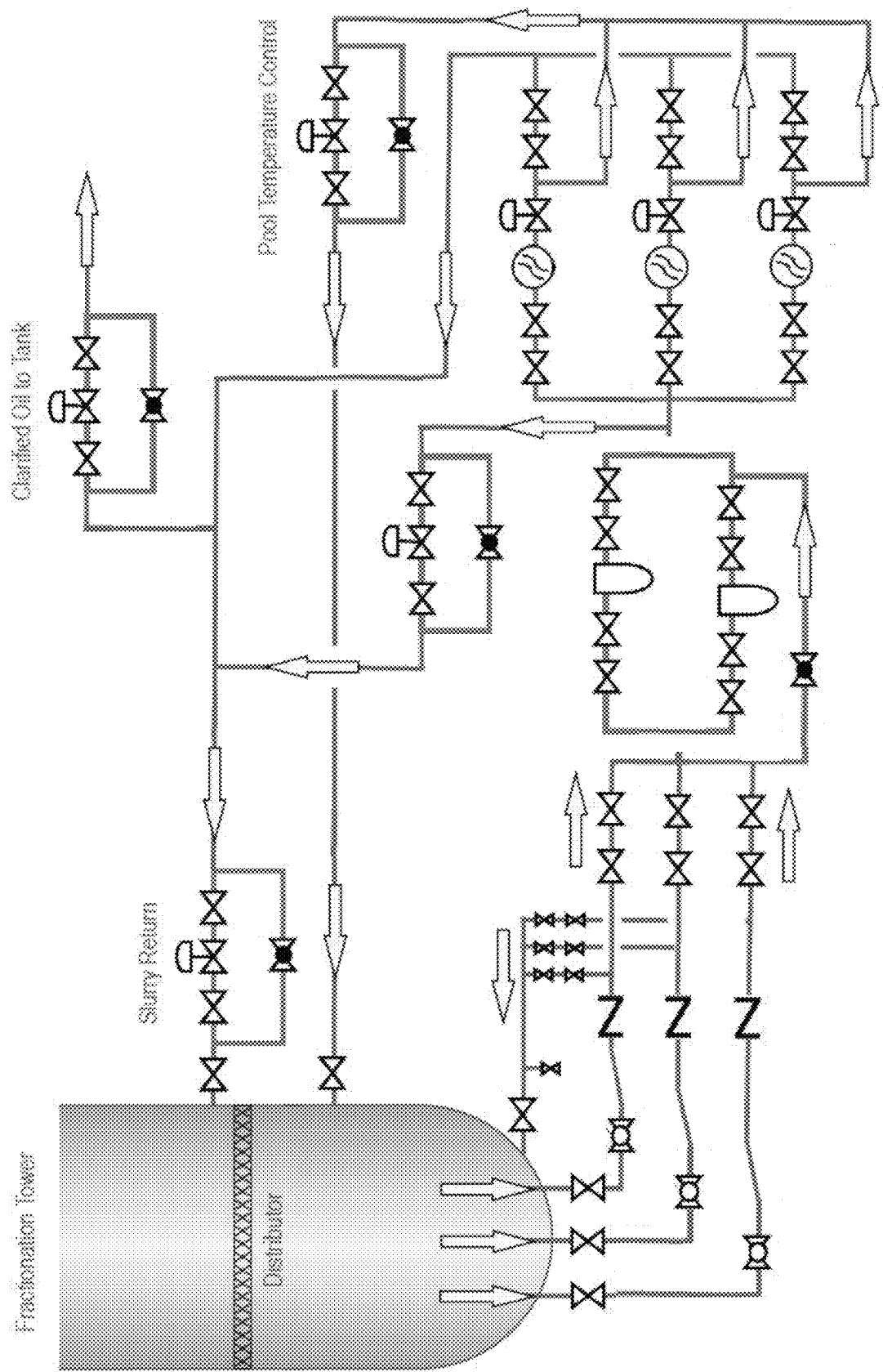
Figure 3A:
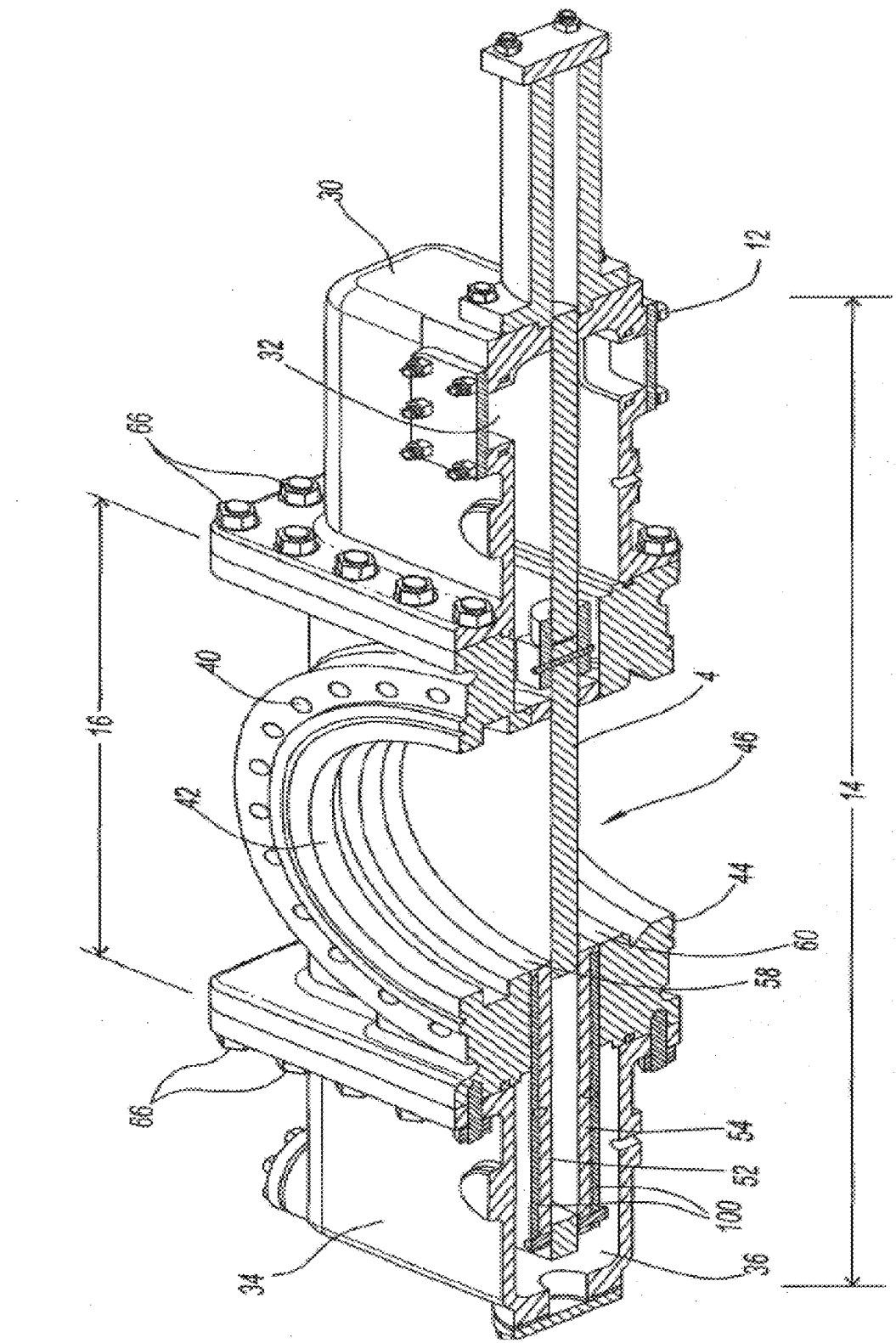
FIGS. 3A-3D illustrate a cutaway of some embodiments of an isolation valve in a closed position.
Figure 3B:
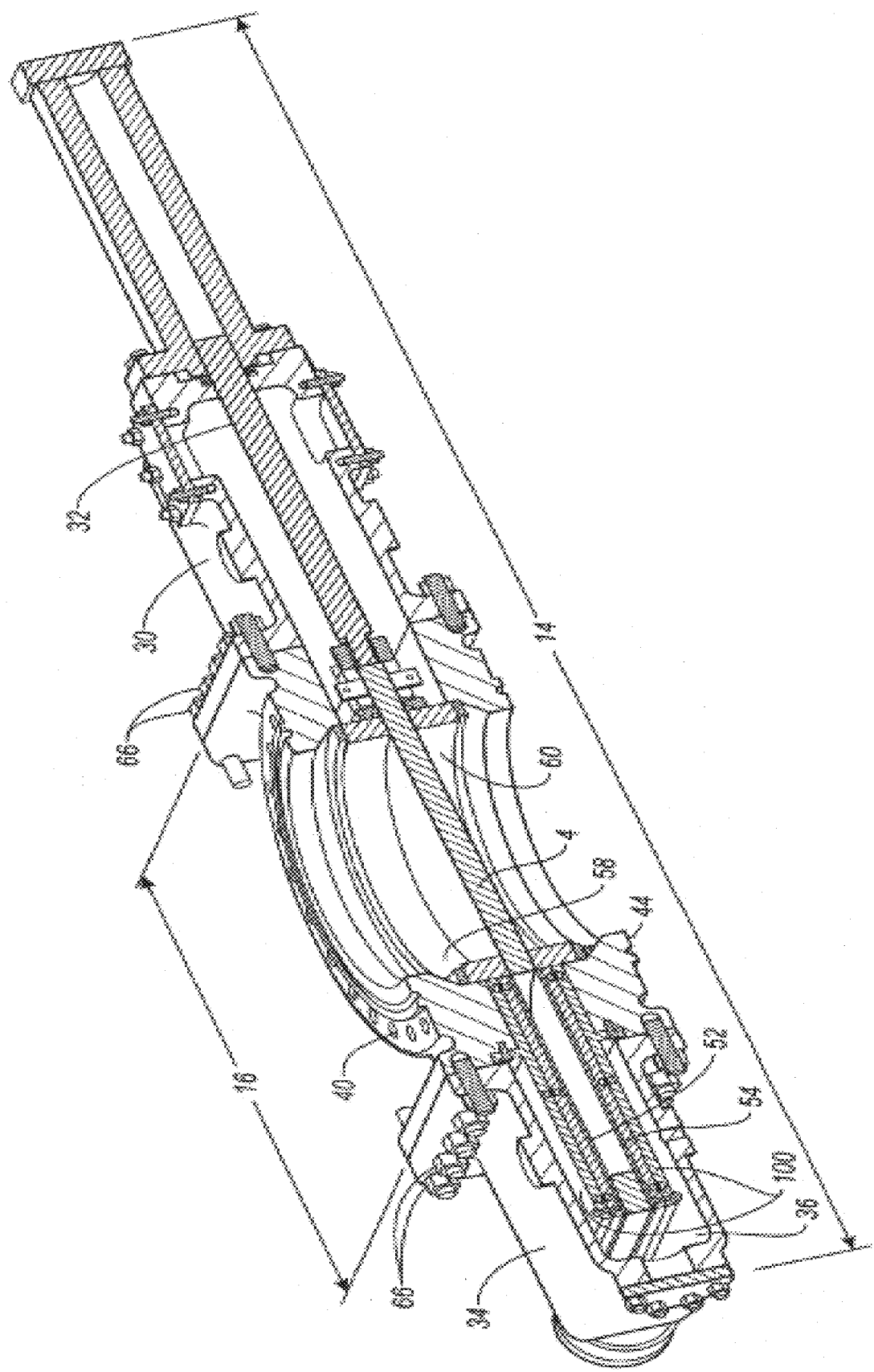
Figure 3C:
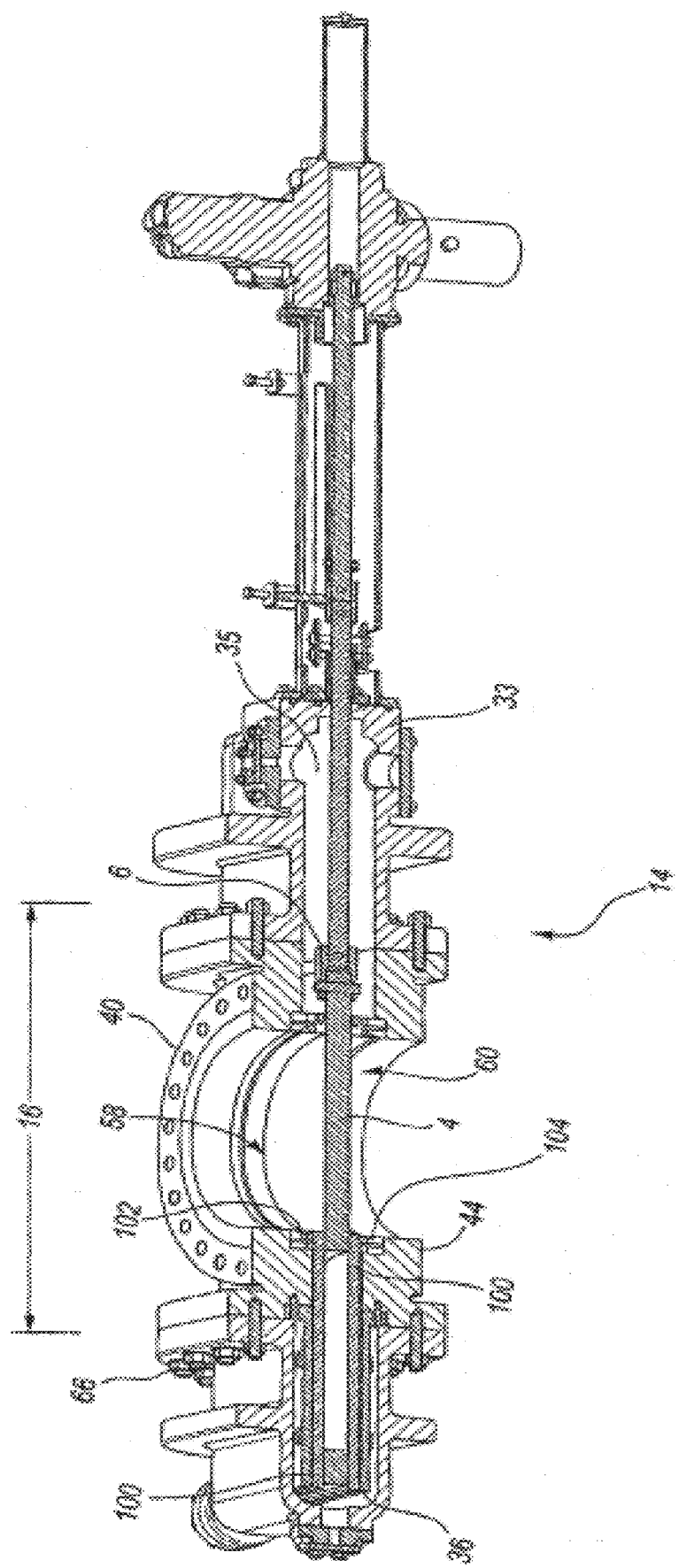
Figure 3D:
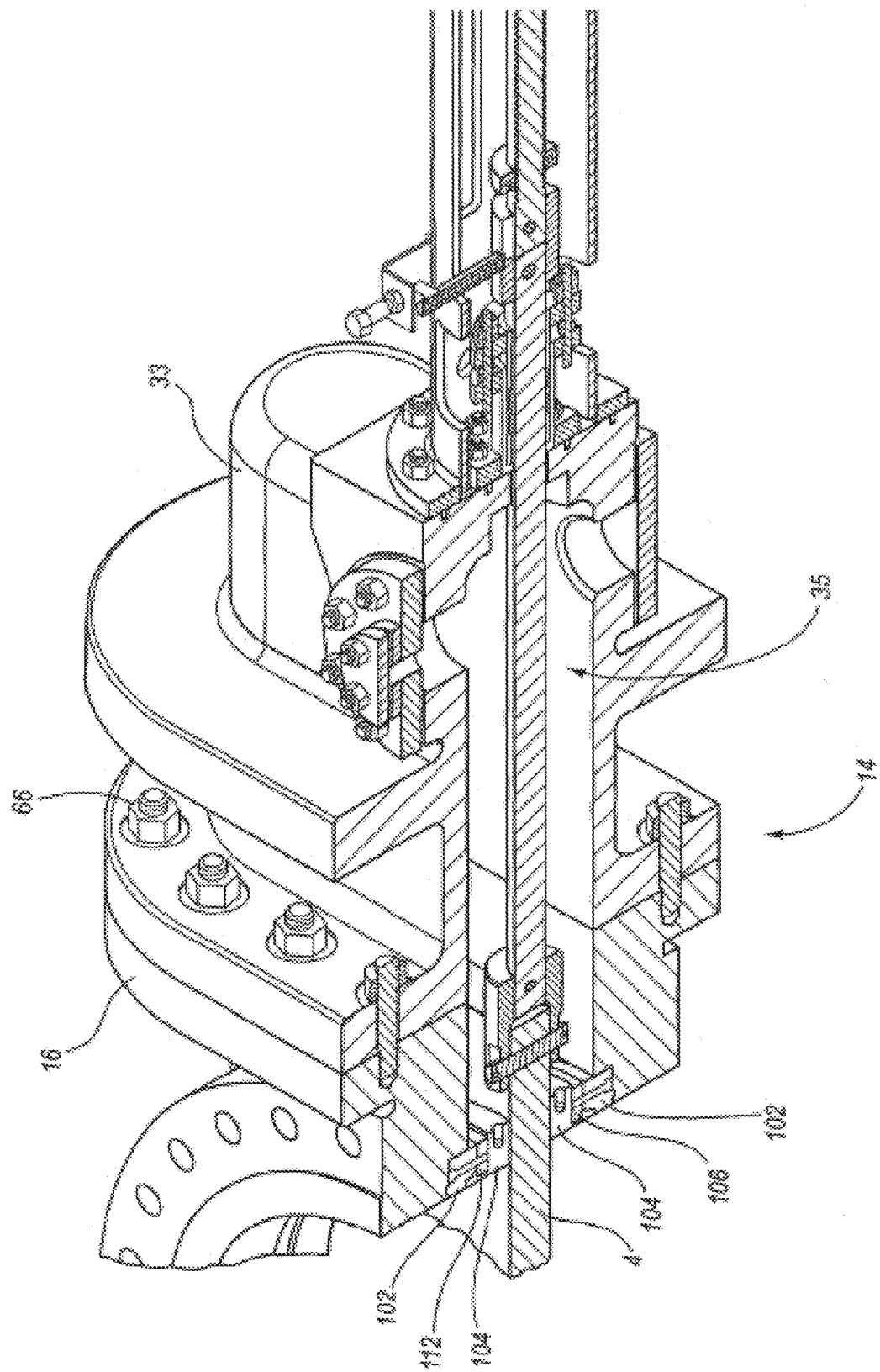
Figure 4:
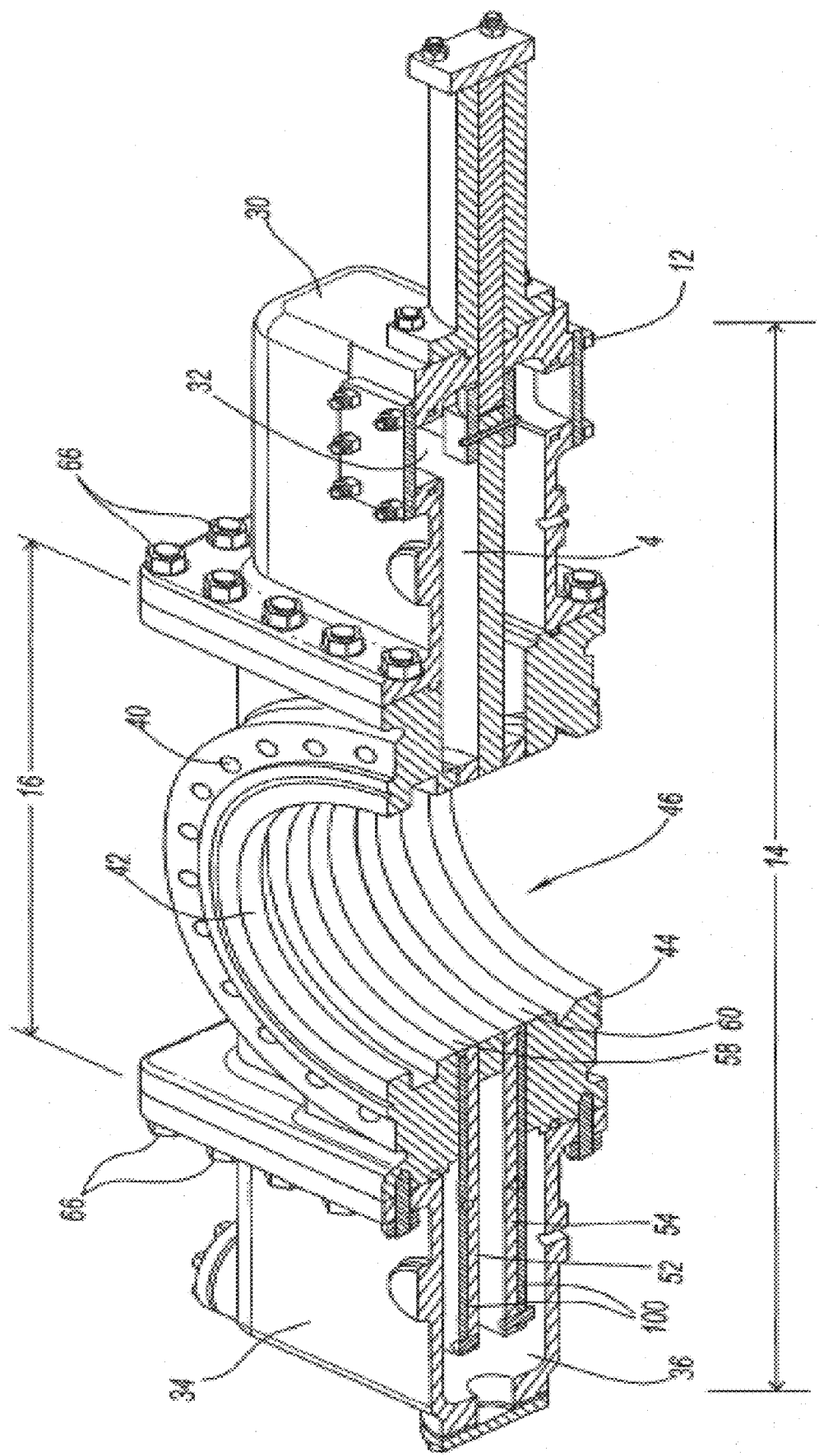
FIG. 4 illustrates a cutaway of some embodiments of an isolation valve in an open position.
Figure 5:
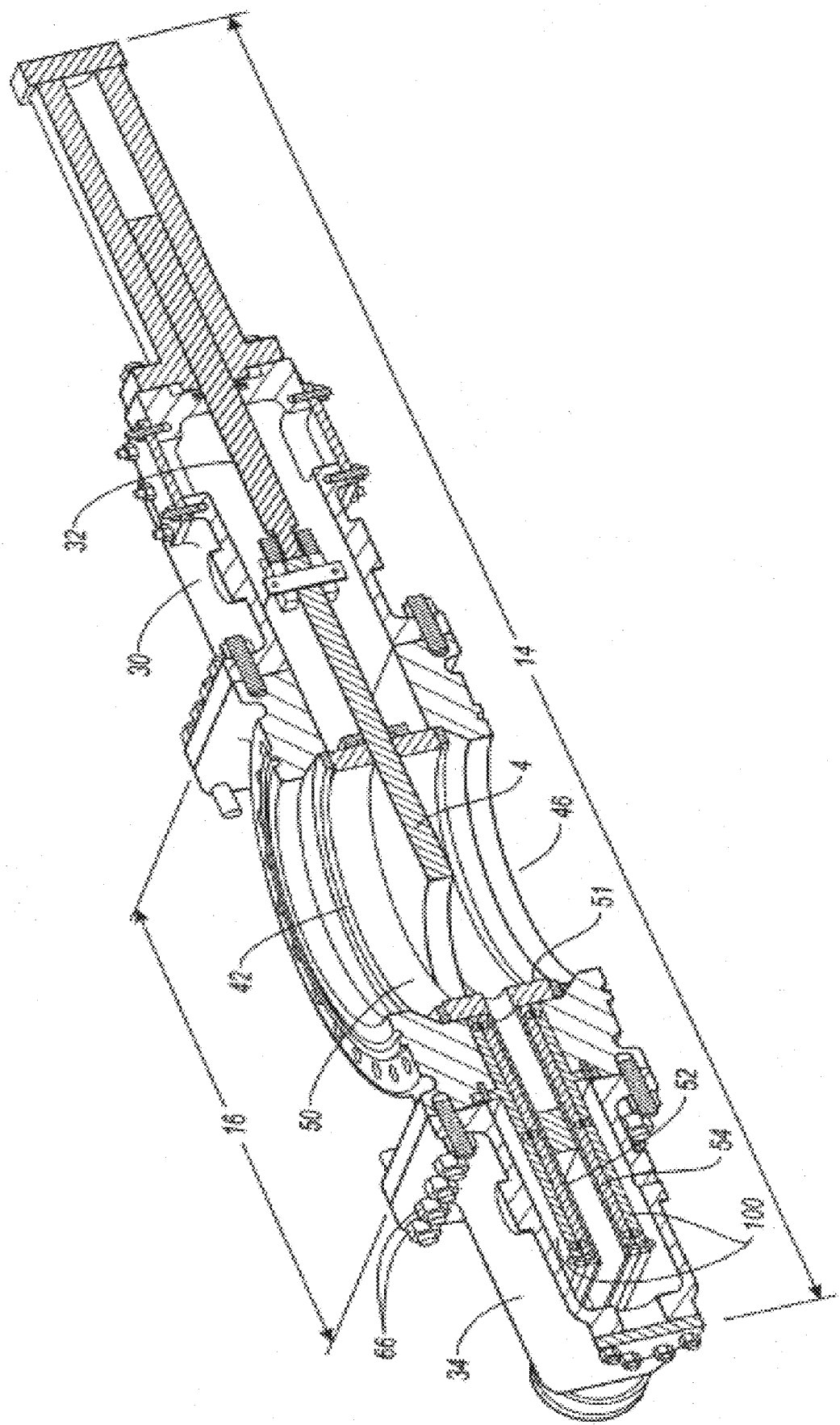
FIG. 5 illustrates an isolation valve in a partially open or throttled position according to some embodiments.
Figure 6:
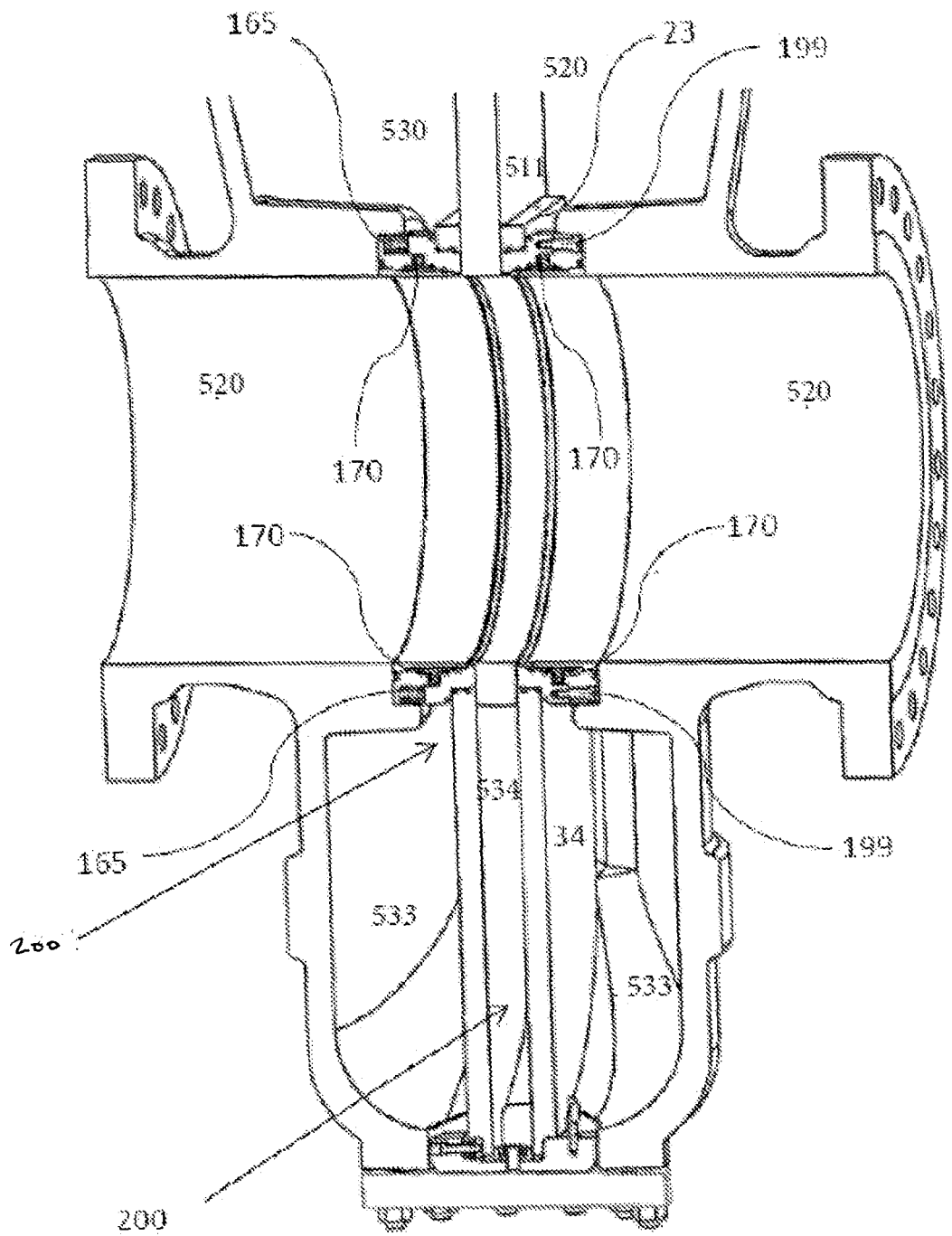
FIG. 6 illustrates a close-up cut-away view of a sealing assembly, biasing assembly and liquid chamber according to some embodiments of the present invention.
Figure 7:
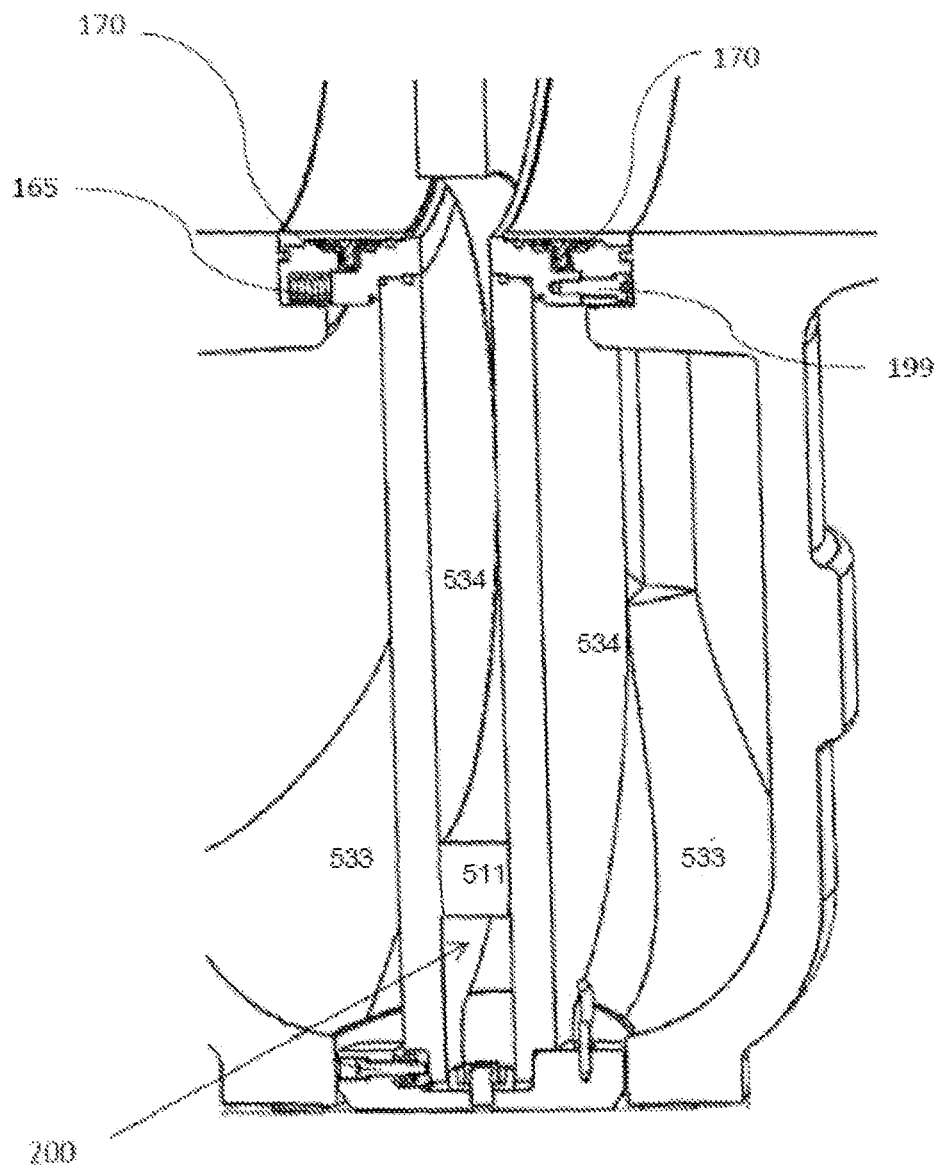
FIG. 7 illustrates a cross-sectional view of a floating seat assembly with a liquid purge chamber, according to some embodiments of the present invention.
Figure 8:
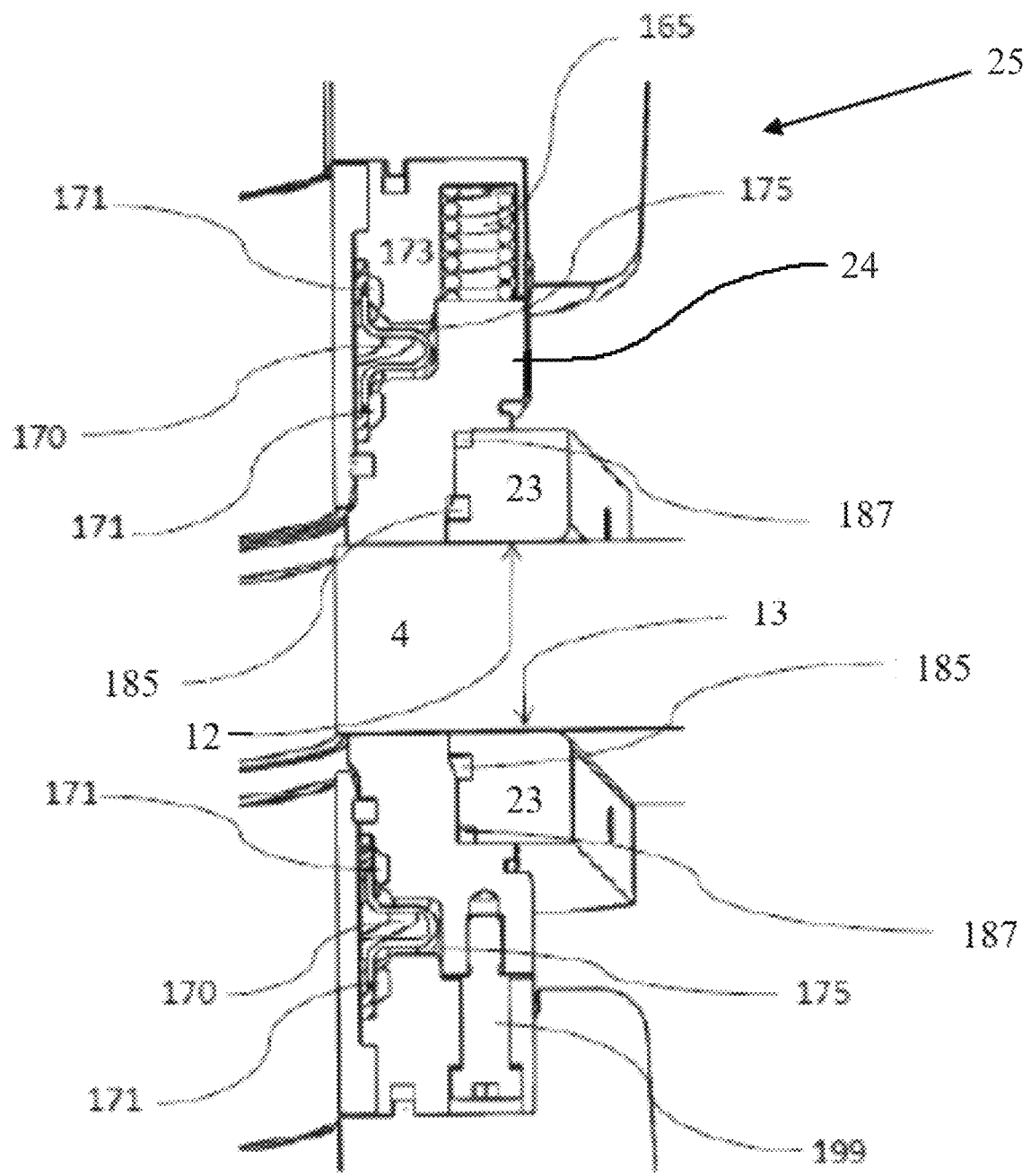
FIG. 8 illustrates a cross-sectional view of a biasing assembly with a liquid purge chamber, according to some embodiments of the present invention.
Figure 9:
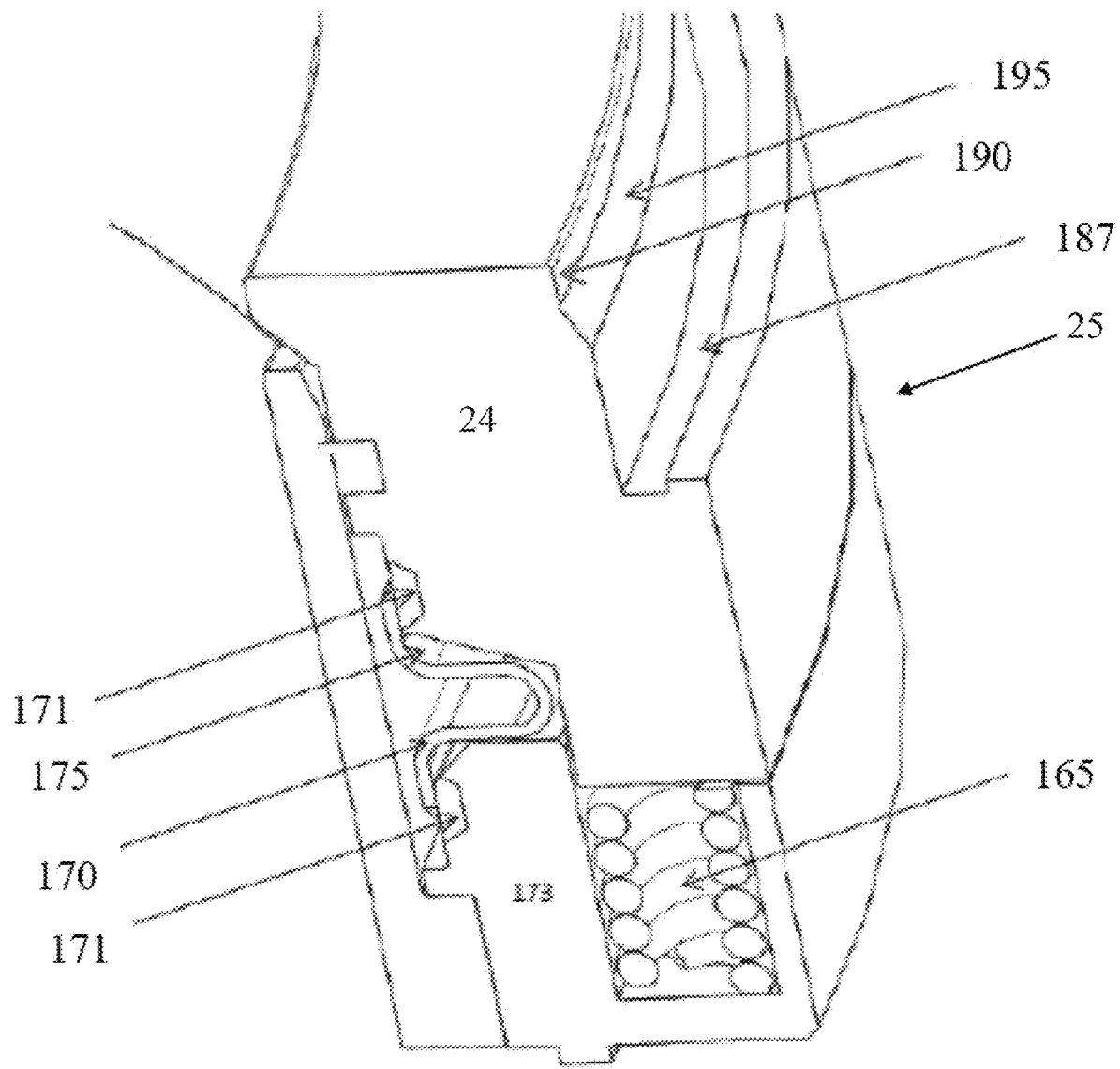
FIG. 9 illustrates a perspective cross-sectional view of a valve seat with a liquid purge chamber, according to some embodiments of the present invention.
Figure 10:
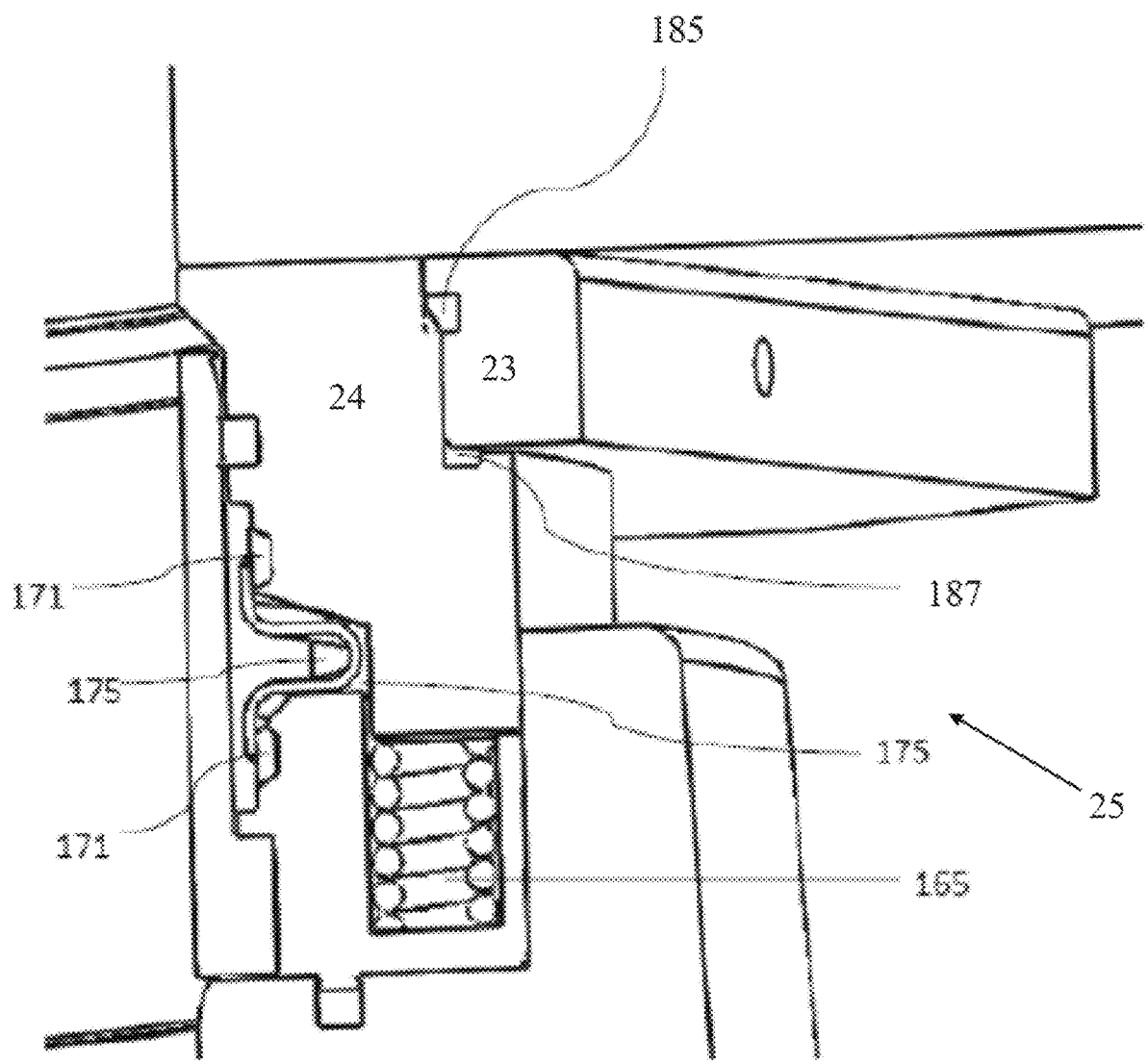
FIG. 10 illustrates a cross-sectional view of the valve seat with a liquid purge chamber of FIG. 9.
Figure 11:
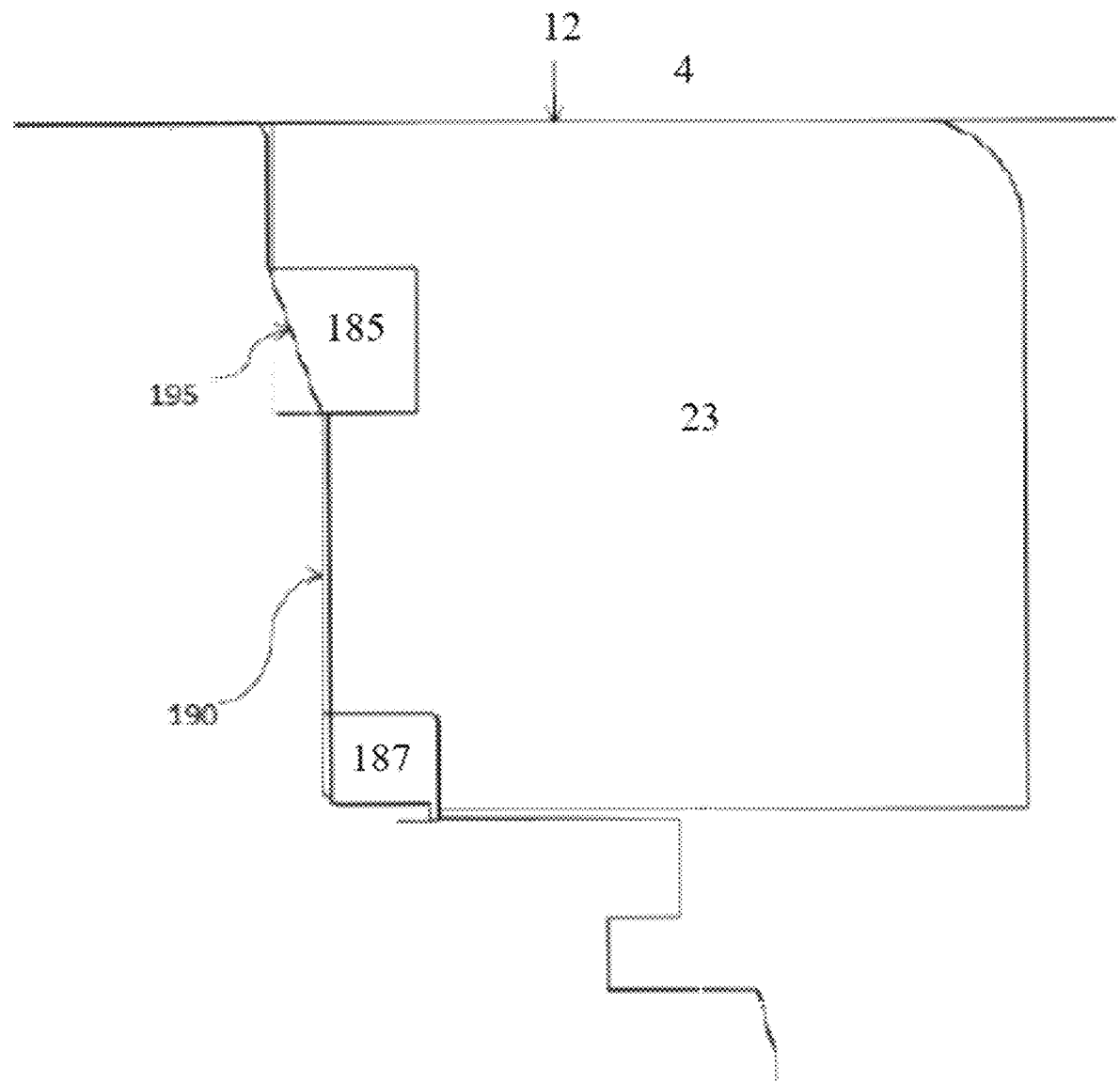
FIG. 11 illustrates a close-up cross-sectional view of part of the valve seat with a liquid purge chamber of FIGS. 9-10.

Some refining processes are shown in FIGS. 2A-2C, which illustrate exemplary refining operations, highlighting various lines utilized to convey matter, including gases, liquids and solids from one location to another throughout the operation. The schematic flow diagram of a typical modern unit in FIG. 2A is based upon a "side-by-side" configuration. The preheated high-boiling petroleum feedstock (at about 315 to 430° C.) consisting of long-chain hydrocarbon molecules is combined with recycle slurry oil from the bottom of the distillation column and injected into the catalyst riser where it is vaporized and cracked into smaller molecules of vapor by contact and mixing with the very hot powdered catalyst from the regenerator. All of the cracking reactions take place in the catalyst riser within a period of 2-4 seconds. The hydrocarbon vapors "fluidize" the powdered catalyst and the mixture of hydrocarbon vapors and catalyst flows upward to enter the reactor at a temperature of about 535° C. and a pressure of about 1.72 bar.

The reactor is a vessel in which the cracked product vapors are separated from the spent catalyst by flowing through a set of two-stage cyclones within the reactor, and the spent catalyst flows downward through a steam stripping section to remove any hydrocarbon vapors before the spent catalyst returns to the catalyst regenerator. The flow of spent catalyst to the regenerator is regulated by a slide valve in the spent catalyst line.

Since the cracking reactions produce some carbonaceous material (referred to as catalyst coke) that deposits on the catalyst and very quickly reduces the catalyst reactivity, the catalyst is regenerated by burning off the deposited coke with air blown into the regenerator. The regenerator operates at a temperature of about 715° C. and a pressure of about 2.41 bar, hence the regenerator operates at about 0.7 bar higher pressure than the reactor. The combustion of the coke is exothermic and it produces a large amount of heat that is partially absorbed by the regenerated catalyst and provides the heat required for the vaporization of the feedstock and the endothermic cracking reactions that take place in the catalyst riser.

The hot catalyst (at about 715° C.) leaving the regenerator flows into a catalyst withdrawal well where any entrained combustion flue gases are allowed to escape and flow back into the upper part to the regenerator. The flow of regenerated catalyst to the feedstock injection point below the catalyst riser is regulated by a slide valve in the regenerated catalyst line. The hot flue gas exits the regenerator after passing through multiple sets of two-stage cyclones that remove entrained catalyst from the flue gas.

The amount of catalyst circulating between the regenerator and the reactor amounts to about 5 kg per kg of feedstock, which is equivalent to about 4.66 kg per liter of feedstock. Thus, an FCC unit processing 75,000 barrels per day (11,900 m3/d) will circulate about 55,900 tons per day of catalyst.

The reaction product vapors (at 535° C. and a pressure of 1.72 bar) flow from the top of the reactor to the bottom section of the main column (commonly referred to as the main fractionator where feed splitting takes place) where they are distilled into the FCC end products of cracked petroleum, naphtha, fuel oil, and offgas. After further processing for removal of sulfur compounds, the cracked naphtha becomes a high-octane component of the refinery's blended gasolines.

The main fractionator offgas is sent to what is called a gas recovery unit where it is separated into butanes and butylenes, propane and propylene, and lower molecular weight gases (hydrogen, methane, ethylene and ethane). Some FCC gas recovery units may also separate out some of the ethane and ethylene.

Although the schematic flow diagram FIG. 2A depicts the main fractionator as having only one sidecut stripper and one fuel oil product, many main fractionators have two sidecut strippers and produce a light fuel oil and a heavy fuel oil. Likewise, many FCC main fractionators produce a light cracked naphtha and a heavy cracked naphtha. The terminology light and heavy in this context refers to the product boiling ranges, with light products having a lower boiling range than heavy products.

The bottom product oil from the main fractionator contains residual catalyst particles which were not completely removed by the cyclones in the top of the reactor. For that reason, the bottom product oil is referred to as a slurry oil.

Part of that slurry oil is recycled back into the main fractionator above the entry point of the hot reaction product vapors so as to cool and partially condense the reaction product vapors as they enter the main fractionator. The remainder of the slurry oil is pumped through a slurry settler. The bottom oil from the slurry settler contains most of the slurry oil catalyst particles and is recycled back into the catalyst riser by combining it with the FCC feedstock oil. The clarified slurry oil or decant oil is withdrawn from the top of slurry settler for use elsewhere in the refinery, as a heavy fuel oil blending component, or as carbon black feedstock.

Depending on the choice of FCC design, the combustion in the regenerator of the coke on the spent catalyst may or may not be complete combustion to carbon dioxide $CO_2$. The combustion air flow is controlled so as to provide the desired ratio of carbon monoxide (CO) to carbon dioxide for each specific design.

In the design shown in FIG. 1, the coke has only been partially combusted to $CO_2$. The combustion flue gas (containing CO and $CO_2$) at 715° C. and at a pressure of 2.41 bar is routed through a secondary catalyst separator containing swirl tubes designed to remove 70 to 90 percent of the particulates in the flue gas leaving the regenerator. This is required to prevent erosion damage to the blades in the turbo-expander that the flue gas is next routed through.

The expansion of flue gas through a turbo-expander provides sufficient power to drive the regenerator's combustion air compressor. The electrical motor-generator can consume or produce electrical power. If the expansion of the flue gas does not provide enough power to drive the air compressor, the electric motor/generator provides the needed additional power. If the flue gas expansion provides more power than needed to drive the air compressor, then the electric motor/generator converts the excess power into electric power and exports it to the refinery's electrical system.

The expanded flue gas is then routed through a steam-generating boiler (referred to as a CO boiler) where the carbon monoxide in the flue gas is burned as fuel to provide steam for use in the refinery as well as to comply with any applicable environmental regulatory limits on carbon monoxide emissions.

The flue gas is finally processed through an electrostatic precipitator (ESP) to remove residual particulate matter to comply with any applicable environmental regulations regarding particulate emissions. The ESP removes particulates in the size range of 2 to µm from the flue gas. Particulate filter systems, known as Fourth Stage Separators (FSS) are sometimes required to meet particulate emission limits. These can replace the ESP when particulate emissions are the only concern.

The steam turbine in the flue gas processing system (shown in the above diagram) is used to drive the regenerator's combustion air compressor during start-ups of the FCC unit until there is sufficient combustion flue gas to take over that task.

The fluid catalytic cracking process breaks large hydrocarbons by their conversion to carbocations, which undergo myriad rearrangements breaking high boiling, straight-chain alkane (paraffin) hydrocarbons into smaller straight-chain alkanes as well as branched-chain alkanes, branched alkenes (olefins) and cycloalkanes (naphthenes). The breaking of the large hydrocarbon molecules into smaller molecules is more technically referred to by organic chemists as scission of the carbon-to-carbon bonds. Some of the smaller alkanes are then broken and converted into even smaller alkenes and branched alkenes such as the gases ethylene, propylene, butylenes, and isobutylenes. Those olefinic gases are valuable for use as petrochemical feedstocks. The propylene, butylene and isobutylene are also valuable feedstocks for certain petroleum refining processes that convert them into high-octane gasoline blending components. The cycloalkanes (naphthenes) formed by the initial breakup of the large molecules are further converted to aromatics such as benzene, toluene, and xylenes, which boil in the gasoline boiling range and have much higher-octane ratings than alkanes. In the cracking process carbon is also produced which gets deposited on the catalyst (catalyst coke).

In particular FIGS. 2B-2C illustrate some of the locations where various embodiments of the isolation valves of the present invention may be utilized. Some embodiments of the valve 14 may be connected to any line or to a slurry circuit. In some embodiments hydrocarbons from the FCCU are routed into the functional space of an isolation valve, such as the bonnet under a positive pressure greater than the process media, such as a slurry. This is under positive pressure so as to prevent the process media from entering the valve housing. In some embodiments where the hydrocarbon purge media is used to purge the slurry circuit isolation valve mixes, the refined hydrocarbon purge media mixes with the process media where it is then returned to the fractionation tower for distillation.

The feedstock is usually that portion of the crude oil that has an initial boiling point of 340° C. (644° F.) or higher at atmospheric pressure and an average molecular weight ranging from about 200 to 600 or higher. This portion of crude oil is often referred to as heavy gas oil or vacuum gas oil (HVGO). In the process, the feedstock is heated to a high temperature and moderate pressure, and brought into contact with a hot, powdered catalyst. The catalyst breaks the long-chain molecules of the high-boiling hydrocarbon liquids into much shorter molecules, which are collected as a vapor.

Fractionation towers also known as distillation columns or fractionators,_ and isolation valves are used throughout refineries and chemical plants. The fractionation tower distills a chemical mixture into its component parts, or fractions, based on the differences in volatilities. Often fractionators have outlets at intervals up the column so that multiple products having different boiling ranges may be withdrawn from a column distilling a multi-component feed stream. The "lightest" products with the lowest boiling points exit from the top of the columns and the "heaviest" products with the highest boiling points exit from the bottom.

Fluid catalytic cracking (FCC) is one of the most important conversion processes used in petroleum refineries. It is widely used to convert the high-boiling, high-molecular weight hydrocarbon fractions of petroleum crude oils into more valuable gasoline, olefinic gases, and other products. Cracking of petroleum hydrocarbons uses a catalyst because it produces more gasoline with a higher octane rating. It also produces byproduct gases that have more carbon-carbon double bonds (i.e. more olefins), and hence more economic value.

The feedstock to FCC is usually that portion of the crude oil that has an initial boiling point of 340° C. (644° F.) or higher at atmospheric pressure and an average molecular weight ranging from about 200 to 600 or higher. This portion of crude oil is often referred to as heavy gas oil or vacuum gas oil (HVGO). In the FCC process, the feedstock is heated to a high temperature and moderate pressure, and brought into contact with a hot, powdered catalyst. The catalyst breaks the long-chain molecules of the high-boiling hydrocarbon liquids into much shorter molecules, which are collected as a vapor.

The feed stock passes through a reactor and into a fractionator where feed splitting takes place. In the fractionator the feed stock is distilled into the FCC end products of cracked petroleum naphtha, fuel oil, and offgas. After further processing for removal of sulfur compounds, the cracked naphtha becomes a high-octane component gasolines.

FCC main fractionators often have two sidecut strippers and produce a light fuel oil and a heavy fuel oil. Likewise, many FCC main fractionators produce a light cracked naphtha and a heavy cracked naphtha. The terminology light and heavy in this context refers to the product boiling ranges, with light products having a lower boiling range than heavy products.

The bottom product oil from the main fractionator contains residual catalyst particles. For that reason, the bottom product oil is referred to as a slurry oil. Part of the slurry oil is pumped through a slurry settler. The bottom oil from the slurry settler contains most of the slurry oil catalyst particles and is recycled back into the catalyst riser by combining it with the FCC feedstock oil. The clarified slurry oil or decant oil is withdrawn from the top of slurry settler for use elsewhere in the refinery, as a heavy fuel oil blending component, as carbon black feedstock, or in some cases the slurry oil is pumped through a bottom circuit for use in heat recovery or steam creation using a slurry bottom circuit.

Isolation valves are used in fluid handling systems to stop the flow of process media to a given location. Isolation valves can also be used to provide flow logic (selecting one flow path versus another), and to connect external equipment to a system. A valve is classified as an isolation valve because of its intended function in a system, not because of the type of the valve itself. Therefore, many different types of valves can be classified as isolation valves. Isolation valves must effectively stop the passage of fluids. Gate valves, ball valves, plug valves, globe valves and butterfly valves may be considered to provide tight and effective shut-off when the valve trim, or internal mechanisms, create the necessary seal.

Embodiments of an Isolation Valve

The present disclosure may be utilized in association with isolation valves, such as those described in U.S. patent application Ser. Nos. 12/848,013 and 16/403,039 which are incorporated herein by reference. The invention may be utilized on bottom slurry circuits, such as those shown in FIGS. 2B-2C, along with any isolation valve used in an FCCU. One ordinarily skilled in the art will recognize that the invention as explained and described herein use of fractionator hydrocarbons as purge media for isolation valves may also be designed and used for other systems as well.

The present disclosure describes valve purge media systems and methods for purging isolation valves such as those used in a bottom slurry circuit systems. Such systems and methods may be utilized within other critical service applications, such as in connection with inlet feed line isolation, fractionator isolation, and back warming.

The present invention may be utilized to control the flow of process media, matter, (including slurry fluid), and any other fluids, solids, and/or gases, at any point in the isolation valve operation so as to prevent these substances from entering the valve trim (e.g. a bonnet, actuator, seat, or seal of the valve) and preventing proper operation. Additionally, one ordinarily skilled in the art will recognize that the valve as explained and described herein may also be designed and used in other environments in which controlling the movement of matter, including fluids, solids and/or gases, is desirable.

Examples of isolation valves, and related internal trim are shown in FIGS. 3-11, which illustrate a valve system and method for isolating the flow of a substance in a line 2. The present invention is especially adapted to isolation valves used in connection with a bottom slurry circuit. It is foreseeable, however, that the present invention may be adapted to be an integral part of other manufacturing processes producing various elements, and such processes should thus be considered within the scope of this application. Prior to reciting the specifics of the present invention, it should be noted that the present invention system and method is designed to have or possess significant functional, utility, and safety advantages over prior related designs and systems.

Some embodiments of the valve system may comprise a seat system for isolating the flow of slurry oil through a line from the bottom of the fractionator tower.

Some embodiments comprise: a) an valve coupled to a line in the FCCU operation wherein the line may be an outlet slurry oil line, and a seat system; and b) a structure for actuating the blind.

Some embodiments may comprise at least one bonnet 30. Some embodiments may comprise an upper and lower bonnet coupled to a main body, wherein the bonnet may be removed in order to replace valve parts without separating the main body from the line. Some embodiments may comprise one or more plates located inside a bonnet, wherein the plate(s) comprise a planar surface that may contact one or more surfaces on the blind.

Some embodiments of the system may be structured to isolate gases and hot liquids particularly those utilized in the FCCU operations. Some embodiments are structured to provide the benefit of allowing for reliable, extended flow isolation without decreased performance. In some embodiments, maintained high valve performance over extended periods of time is enhanced by features of the invention including purging the valve with LCO, MCO or HCO to maintain proper contact between the seats and the blind, which acts to remove any debris from internal components of the valve. In prior art systems, the likelihood of coking up or oiling up required frequent rebuilds and therefore removal of valves from a line.

In some embodiments, the system is configured to purge (with hydrocarbons) the main body of the valve and the upper and lower bonnet, each of which may be independently removed to replace valve parts without separating the main body from the line 2. Within the bonnet 30 of some embodiments there may be a first plate 52, and there may be a second plate 54 located in opposition to the first plate to allow a blind 4 to maintain surface contact with the plate(s). Positive pressure of the hydrocarbon purge along with the plate/blind system located within the bonnet 30 can prevent the escape of matter, such as slurry oil, from a line into the bonnet 30. Accordingly, some embodiments prevent exposure of the internal elements of the valve system 14 to matter traveling through the line. Consequently, the internal components of a valve system 14 may remain clean and free from debris and build up.

Some embodiments are configured to allow purge of a structure for supporting a blind 4 (the structure comprising a seat support system 50) with a liquid purge medium. The seat support system 50 may comprise an arrangement or configuration of seats depending upon the type of valve. In some embodiments the structure for supporting the blind 4 comprises a seat support system 50, which comprises a first seat 58 and a second seat 60 disposed on either side of the blind 4, wherein the first seat 58 and the second seat 60 may be independent from one another. In some embodiments, the first seat 58 and the second seat 60 may each be a pressurized seat cartridge. The first and second seats 58, 60 may have either a static or a dynamic nature, such that one may be static and the other dynamic, both may be dynamic, or both may be static. Alternatively, the seat support system 50 may comprise a single seat situated or disposed between the main body 16 of the valve system 14 and the blind 4. In this configuration, this single seat applies continuous force to the blind throughout its oscillation. In single seat systems the single seat may be dynamic or it may be static depending upon the type of valve and the needs of the system specification and any other contributing factors.

Embodiments of the valve system comprise a liquid purge system wherein refined hydrocarbons from the fractionation tower are pumped to one or more isolation valves for use in the isolation valve as the liquid purge media. In some embodiments the liquid purge system may utilize a line to pull refined hydrocarbons from the fractionator to the bottom slurry circuit isolation valve for use as a liquid purge media. In some embodiments the liquid purge media is maintained at a positive pressure, or a pressure greater than the pressure in the line, so as to continually pump hydrocarbons into the line and prevent the process media, such as slurry oil, from entering the valve seat, bonnets, or other internal components. The pressure within the purge fluid system is maintained by using a fluid that is at a pressure greater than the process media in the valve.

Some embodiments of the liquid purge media system may comprise an internal gas/liquid containment system that provides or maintains isolation of the fluid (including gas) within the system. The internal fluid containment system may comprise a metal-to-metal contact seal described herein as well as a unique component configuration existing within the bonnet 30 of the valve system 14. The liquid purge medium maintained at a positive pressure forces hydrocarbons through the metal-to-metal contact seals, to the extent fluid can pass through such, to prevent process fluid from passing the other way through such seals into the valve's internal components.

In some embodiments the pumps pumping the liquid purge media to the isolation valve may be turned off so the internal components (including the seat systems 50, seats 58, 60 and blind 4) may be inspected, repaired, and/or replaced without detaching the main body 16 of the valve from the line 2.

In some embodiments the valve system 14 comprises a liquid-purged body where the purge media is maintained at a temperature that regulates the valve body temperature, and that may be structured to create a barrier against gas, fluid, and solid migration. The purge elements of these embodiments prevent the movement of matter into the upper bonnet 33 and lower bonnets 340 from the line 2. Accordingly, the internal components of some embodiments do not become encumbered by coke deposits or build up. The internal components require significantly less repair and replacement. Accordingly, some embodiments of the valve operate reliably for extended periods of time without decreased performance.

Some embodiments are structured mechanically to work cooperatively with the liquid purge media by oscillating under conditions where valve blind 4 is maintained in a partially opened or throttled position. In some embodiments the internal components of the bonnet 30 prevent the build-up of oil, coke, or debris inside the bonnet 30. Because some of the embodiments have liquid purge fluid under positive pressure the internal components of the valve system 14 are not exposed to slurry oil, coke, and/or other build up while the valve 14 is maintained in a partially opened condition. For example, some embodiments of the valve system 14 utilize a liquid purge system which creates a positive pressure inside of the bonnet 30 forcing the contents of a line to remain inline and prevent the contents of the line from moving into the internal components of the valve 14.

In some embodiments, there may be additional mechanical features which operate cooperatively with the liquid purge media to allow the valve to be maintained in a partially opened position without compromising the performance of the valve over extended periods of time. For example, in some embodiments the seat system 50 maintains continuous contact with the blind 4. The continuous contact in some embodiments shears accumulated coke and/or other debris, preventing accumulated material from building up upon the valve system 14 itself and from falling into the various internal components of the valve system 14. Some embodiments utilize a system, which is located inside the bonnet 30, which maintain contact with the blind 4 of the valve system 14 while the blind 4 moves through the open and closed positions. In some embodiments the bonnet 30, preferably the lower bonnet 34 of the valve 14, contains one or more plates 52, 54 which opposably face each other and are biased against the surface of the gate-blind 4 present within the lower bonnet 34. In some embodiments a spring is coiled and biased against the lower bonnet 34 to lie between the bonnet 30 and the blind 4. Accordingly, the spring system 56 of some embodiments press the seat plate 23 located in the lower bonnet 34 against the surface of the blind 4. The liquid purge media along with the plate system located in the bonnet system 30 prevents the movement of gases, fluids, or solid matter from the line into the bonnet 30. Accordingly, the combination of the liquid purge media system and plate system prevents the contents of the line from coming into contact with the internal elements of the valve system 14.

Turning to the Figures of the present invention and a more detailed analysis of some of the embodiments of the invention, FIG. 1 depicts, generally, a petroleum manufacturing and refinery process. Lighter fractions, steam and gases are released from the online coke vessel through the vapor lines 2-a and 2-b.

FIGS. 3A-3D depicts an embodiment of an isolation valve in an open position. In some embodiments, the valve as depicted may be connected one or more of the above described positions (see FIG. 2). Each of FIGS. 3A, 3B, 3C and 3D illustrate different embodiments of a valve system 14.

The valves depicted in FIGS. 3-11 are embodiments of isolation valves; however, it is intended that the valve system 14 may comprise a variety of valve types, and a variety of different elements. The seat system 50 (e.g., the dual, metal seat surfaces in some embodiments), the bonnet interior (comprising a lower chamber 35 and an upper chamber 36), and all internal parts are fully protected and isolated from any matter flowing through a line 2 while the valve is in the fully open, fully closed (see FIG. 4A) or partially opened (see FIG. 5A) positions. Preferably, the materials used in the construction of sealing parts are resistant to corrosion and are designed for exceptionally high metal-to-metal cycle duty. The seals of the valve system 14 are designed to cleanly break the bond between the coke and the exposed surface of the blind at each stroke, and the coke is prevented from entering the internal components by the liquid purge media. The total thrust required for this action combined with the thrust required to overcome seating friction and inertia is carefully calculated and is accomplished by actuating the blind 4, thus causing it to relocate or transition from a closed to an open position.

In some embodiments, part of the liquid slurry is returned to the FCCU in an FCC process to recover hydrocarbons from the liquid slurry. A liquid purge medium is used to purge the isolation valve of any process fluid, such as bottom slurry, to prevent the process fluid from entering the valve body or bonnets. In some embodiments, a check valve is used to maintain a pressure of greater than 10 psi in the system. Using a liquid purge medium provides added benefits over traditional steam or nitrogen. First, the liquid purge medium can be produced during the distillation process; in contrast, steam or nitrogen must be manufactured separately. Liquid slurry created downline is often pressurized in the process. Any portion of the hydrocarbon purge media injected into the liquid slurry while purging the isolation valve can be recycled back into the fractionator above the entry point of the hot reaction product vapors so as to cool and partially condense the reaction product vapors as they enter the coker fractionator. The remainder of the liquid slurry is pumped through a slurry settler. The bottom oil from the slurry settler contains most of the liquid slurry catalyst particles in FCCU process and is recycled back into the catalyst riser by combining it with the FCC feedstock oil. FIG. 2C illustrates an exemplary operation, highlighting various lines utilized to convey matter, including gases, liquids and solids from one location to another throughout the operation. FIG. 2A illustrates some of the locations where various embodiments of the isolation valve of the present invention may be utilized. Some embodiments of the valve 14 may be connected to any line 2 or to a coke drum 18. Examples of some positions 10 where embodiments of a valve may be utilized include cutting-water valve, overhead vapor valve, blowdown isolation valve, module isolation valve, back-warming isolation valve, fractionator isolation valve, drum bypass isolation valve, heater charge pump discharge isolation valve, inlet isolation valve, switch manifold isolation valve, pre-heat warm up isolation valve, quench water isolation valve, steam isolation valve, and drain-to-pit isolation valve.

FIGS. 3A-3D depicts an embodiment of the valve system 14 in a closed position. The depicted valve system 14 is structured to be coupled to a line or coke drum to a flange. In some embodiments, the valve as depicted may be connected at one or more of the above described positions in the delayed coker unit operation (see FIG. 2A). Each of FIGS. 3A, 3B, 3C and 3D illustrate different embodiments of a valve system 14.

The valves depicted in FIGS. 3-11 are embodiments of valves of the present invention; however, it is intended that valve 14 may comprise a variety of valve types, and a variety of different elements.

FIGS. 3-11 illustrate various views of a valve system 14, according to various embodiments. The depicted valve system 14 comprises a main body 16 coupled to a bonnet 30 comprising an upper bonnet 33 and a lower bonnet 34, with the upper bonnet comprising an upper chamber 35 and the lower bonnet comprising a lower chamber 36. The main body 16 comprises a first flange 40 having an opening or port 42 therein, and a second flange 44 having an opening or port 46 therein. The main body 16 couples to a complimentary flange portion and associated opening or port of a line 2 or coke drum 18, such that each opening is concentrically aligned with one another.

The depicted isolation valve system 14 further comprises a blind 4 in the form of a sliding blind having an aperture therein that is capable of aligning with openings 42 and 46 in an open position. The blind 4 slides back and forth in a linear, bi-directional manner between means for supporting a blind, shown in this exemplary embodiment as the seat support system 50. The seat support system 50 may comprise any type of seating arrangement, including dual, independent seats (e.g., first and second seats 58, 60), wherein the seats are both static, both dynamic, and a combination of these. The seat support system 50 may alternatively comprise a single seat in support of the blind 4, wherein the seat may comprise a static or dynamic seat.

In one embodiment it is preferable that a continuous contact seal be created between the blind 4 and the seat support system 50, such that during the back and forth sliding (as illustrated in the present figures) or rotation (in alternative valve embodiments) of the blind 4 from an open position, to a semi-opened position, and finally to a closed position, with respect to the line, the created contact seal is never broken or breached, but its integrity is maintained at all times. This continuous contact seal is preferably a metal-to-metal contact seal that performs several functions and has several advantages and operates cooperatively with the liquid purge media described herein. For example, the contact seal creates, or at least contributes to, valve isolation, wherein an isolated environment is provided, such that no material is allowed to escape outside the sealed area and into the bonnets 30 or other parts of the valve system 14, the area outside the valve, or other areas. Various liquid purge systems and containment systems may also function to regulate pressure within the isolation valve 14, to contain the material within designated areas, and to maintain valve isolation. As another example, the continuous contact seal may help to keep various components of the isolation valve clean and free of the product material as these materials are not allowed beyond the area purged by the liquid purge. As another example, as a result of the load exerted upon the blind 4 and resulting tight tolerances existing between the blind 4 and the first and second seats 58, 60, and the actuation of the blind between the first and second seats 58, 60, a burnishing and polishing effect occurs.

In some embodiments, the seat support system 50 comprising first and second seats 58, 60 as well as blind 4 may be made of metal, thus providing a metal-to-metal contact or metal to metal seal, or otherwise referred to as metal to metal seating of blind 4. The metal-to-metal seating increases the durability of the system as there are no non-metal parts, such as vinyl or rubber, used to seal the seats to the blind 4. Metal-to-metal seating allows the system to achieve a higher consistency of sealing, while at the same time providing extended durability. In addition, the metal-to-metal sealing allows the system 14, and specifically the sealing within the system, to be fine-tuned as needed. Each metal-to-metal contact seal in the valve body can be supported.

As the blind 4 is actuated from a closed position to an open position, the contact seal existing between the surface of blind 4 and the surface of means for supporting a blind functions to break up or shear the manufactured coke that has accumulated on or near the surface of blind 4.

Referring now to FIGS. 6-11, which disclose an alternative embodiment of a valve, in some embodiments the first seat and/or second seat 25 comprises a floating seat plate 23 configured to isolate process fluid from entering the valve body of a valve system 14 that is purged by a liquid purge medium. In some embodiments, including a floating seat plate 23 improves and simplifies manufacturing by requiring only that the smaller floating seat plate be ground flat instead of the entire seat 25. In some embodiments, the floating seat plate 23 improves the distribution of loads on the seat. The improved load distribution is accomplished in part by the isolation of the seat plate 23 from the seat body 24. Heat from processing can cause the equipment, including the seat, the blind 4, and the seat plate 23 to thermally expand and change shape. In addition, a pressurized drum can challenges the seal between the seat, the blind 4, and the seat plate 23. In some embodiments the floating seat plate 23 isolates the pressure on the seat so as to allow fewer leaks because the seat is not influenced by the seat attachment. Leaks are further reduced by the liquid purge medium under positive pressure so the residue cannot enter between the seals. In addition, in some embodiments the at least partially independent movement by the floating seat plate allows the seat to partially isolate the pressures inside the drum body from impacting the seat, making the seat pressure more uniform. Finally, separating the seat and the floating seat plate 23 provides greater control and ability to manipulate the force between the floating seat plate and the seat using the spring rates so that the seal is fully loaded by the seat.

In some embodiments the liquid purge medium in combination with the floating seat plate improves the seal between the seat plate 23 and the seat and the seal between the seat plate and the blind 4, particularly as the blind thermally expands and deforms. In some embodiments the seat plate is self-leveling against the blind and comprises a ball/cone and socket configuration to allow articulation by the seat. In some embodiments the cone and socket configuration is provided by an angled shelf 195 and packing at an interface between the seat plate 23 and the seat. As the blind 4 or seat thermally expand and change shape, the floating seat plate is able to articulate and maintain a seal independent of the orientation of the seat. In some embodiments, a spring 165 presses the seat against the blind 4 while a bellows 170 is activated by internal pressuring from a purge liquid to expand the bellows 170 and assist the springs 165 to apply more load on the blind. Any gaps between the seat and seat plate interface are filled with liquid purge medium. The pressure created by the increased volume of purge liquid pumped into the chamber 175 on the valve side of the bellows adds to the pressure already created by the bellows to improve the seal between the seat plate 23 and the blind 4. In some embodiments the liquid purge medium is an incompressible fluid.

In some embodiments the valve comprises a first port 185. In some embodiments the valve comprises a plurality of internal chambers and ports 185, 187. In some embodiments ports 185, 187 are in fluid communication with the valve body so that purge liquid can transport from the valve body through ports 185, 187 to purge liquid chambers 175, through channels formed in the seat assembly. In some embodiments, the operation of the floating seat plate 23 and the pressurized liquid purge medium protect the ports 185, 187 from process fluid in the body and which passes through the opening of a drum as the drum is emptied. In some embodiments two seat plates directly abut seats and blind 4 and prevent process fluid from entering the gate port. In some embodiments the valve comprises lower bonnet plates 34 configured to receive the blind 4 when it is placed in the closed position. In some embodiments the lower bonnet plates 34 isolate the valve body 14 from the process fluid which may migrate with the blind 4 as it is moved from a first position to a second position. In some embodiments the floating seat plate protects the ports 185, 187 at all times from the inside of the bonnet 30, 33 so when the blind is in the open position, the seat plate can still prevent exposure of the ports 185, 187 or the inside of the valve to the process fluid. The ports 185, 187 and channels running through the valve and bonnet are sized to accommodate the liquid purge medium.

In some embodiments an isolation valve 14 is configured to isolate a valve body from the process fluid passing through a valve opening. In some embodiments a seat assembly has a receiving portion that is configured to receive a blind. In some embodiments the receiving portion is in the middle of the seat assembly. In some embodiments the seat assembly 145 comprises a first seat and a second seat disposed on opposite sides of a blind 4 (e.g., on a first side 12 and on a second side 13) and aligned so as to create an opening through which process fluid can selectively pass. In some embodiments the two sides of the seat are bolted together to create a seal between the seat and the blind 4. In some placed two separate seats which are disposed adjacent the blind 4, with a first seat adjacent first side 12 of the blind 4 and a second seat placed adjacent the second side 13 of the blind 4. In some embodiments the blind 4 is configured to be selectively positioned intermediate a first seat and a second seat.

In some embodiments one or both seats of the seat assembly comprises a floating seat plate 23. In some embodiments the floating seat plate is nested inside the inner circumference of the seat 25 so as to abut the seat body 24. In some embodiments the floating seat plate 23 is concentrically nested between the seat body and a valve opening 20 without being attached to the seat. In some embodiments the seat plate is configured to articulate independent of the seat body, to accommodate blind 4 deformations due to thermal expansion or thermal differentials created by greater heat being applied to one location over on the surface of the blind 4 such as when the heat is applied to the blind's first side 12 and not equally applied to the blind's second side 13. In addition, in some embodiments the floating seat plate 23 comprises degrees of motion to accommodate different pressures.

In some embodiments the seat assembly comprises a sealing system which improves the seal between the seat plate 23 and the seat body 24. In some embodiments the sealing system comprises a biasing system that selectively seals the seat plate 23 and the seat, which biases the seat plate 23 against the seat body. In some embodiments the sealing system comprises mechanical shapes and packing members which are integrated at the interface between the seat body and the seat plate.

In some embodiments the biasing system of claim 1 further comprises a first biasing member such as a spring 165, bellows 170, or purge liquid chamber 175. In some embodiments, the biasing system comprises a first biasing member and a second biasing member. In some embodiments, the biasing system comprises a first biasing member, a second biasing member, and a third biasing member. In some embodiments, the first, second, and/or third biasing member comprises a spring 165. In some embodiments, the first, second, and/or third biasing member comprises a bellows 170. In some embodiments, the first, second, or third biasing member comprises a purge liquid chamber 175. In some embodiments, the biasing system comprises any combination of biasing members which function cooperatively to bias the floating seat plate 23 against the seat body 24. In some embodiments the biasing system functions to bias the floating seat plate 23 against the blind 4. In some embodiments the biasing system comprises a plurality of biasing members configured to bias the floating seat plate 23 against a first side 12 of the blind and to bias the floating seat plate 23 against the second side 13 of the blind. In some embodiments, the biasing system further comprises a third biasing member positioned on the second side of the blind configured to bias the seat plate 23 against the seat body in a direction of the blind, or configured to seal the seat plate 23 and the seat against both the first side 12 and the second side 13 of the blind 4. In some embodiments the biasing system comprises a biasing assembly limited in travel by a shoulder bolt 199.

In some embodiments the biasing system (comprising a combination of cooperatively operating biasing members) improves the seal to meet American Petroleum Institute ("API") standards. In some embodiments the floating seat plate 23 is ground flat and positioned in the center of the blind 4. In some embodiments the seat plate 23 is biased against the seat using springs creating a force of nearly 200 PSI. In some embodiments, in addition to biasing the seat plate 23, the springs give the seat plate 23 degrees of freedom, allows the seat plate 23 to move and adjust so to maintain constant contact with the blind 4, and allows the seat plate 23 to remain in mutual contact with the blind 4 through the thermal cycle. In some embodiments the ports 185, 187 further comprises a purge liquid chamber which can be selectively pressurized to expand the chamber and further bias the seat plate 23. The purge medium is pumped into the purge liquid chamber and kept under positive pressure to push purge liquid through the seals and into the process fluid. The bellows 170 is coupled via a welding 171 to a first packing, which in some embodiments is a seat plate 23, and a retainer 173. In some embodiments bellows 170 is coupled via a welding 171 to the seat plate 23 and a packing so as to seal the purge liquid in the purge liquid chamber 175. In some embodiments, purge liquid is pumped into chamber 175, as the purge liquid volume is increased the purge liquid chamber 175 expands the bellows 170 expands, increasing the pressure and the seat plate 23 is further biased against the seat body 24 and the blind 4 to improve the seal between the blind 4 the seat body 24, and the seat plate 23. In some embodiments the biasing system creates a cumulative cooperative force sufficient to meet or exceed the API standards of 820 PSI.

In some embodiments the seat plate 23 comprises a shelf 195 which interfaces with the seat body 24. In some embodiments the shelf 195 is angled to give the seat plate a conical shape as it mates with the seat. In some embodiments, packing is inserted into the seat body/seat plate interface 190 and upon activation the angled shelf 195 is pressed into the seat at the interface 190 and energizes packing by changing the shape of the packing. In some embodiments biasing the seat plate 23 against the seat deforms the packing. In some embodiments, when the blind 4 deforms, the floating seat plate 23 articulates its position to maintain the seal between the seat and the seat plate 23 and the blind 4 and the seat plate 23. In some embodiments the floating seat plate 23 adjusts to the changing surface dimensions of the blind 4 as the blind 4 repositions from an open position to a closed position or from a closed position to an open position. In some embodiments, the packing may be comprise a square cross section with dimensions that are approximately the same as the interface 190. In some embodiments the packing will be slightly larger than the shape of the interface 190. In some embodiments, the packing comprises a segment of packing.

In some embodiments, the packing provides the conically shaped floating seat plate 23 with freedom of movement to articulate with blind 4 thermal expansion as the valve moves through the thermal cycle. In some embodiments the seal is improved by pumping liquid purge medium into the valve body so the liquid purge medium fills any gaps that may form in the seal. In some embodiments the packing further improves the seal between the seat and the floating seat plate 23 even as the seat plate 23 repositions in response to blind 4 shape changes. In some embodiments the floating seat plate 23 maintains a radially biased force against the packing and seat and the blind 4 even as the shape of the blind 4 changes. In some embodiments the floating seat plate 23 maintains a radially biased force against the packing and the seat and the blind. In some embodiments the seat plate 23 and packing isolate the seat from pressure in the body during processing.

In some embodiments packing allows the floating seat plate 23 end-to-end movements so the blind 4 and the floating seat plate 23 and seat touch simultaneously. In some embodiments, the packing does not necessarily seal the interface between the seat plate 23 and the seat body 24, but instead provides for axial movement so the seat plate 23 can become mutual with the seat. Thus, in some embodiments as the blind 4 deforms under thermal expansion the seat plate 23 can reposition independently of the seat to improve the contact, and thus the seal between the seat plate 23 and the blind remains intact.

In some embodiments in addition to being coupled via a welding 171 to the seat plate 23 to isolate purge liquid, bellows 170 is cooperatively biased with the seat plate to enhance and improve the sealing force between the seat plate 23, the seat body 24, and the blind 4. The bellows 170 is coupled via a welding 171 to the seat plate assembly to isolate a purge liquid chamber 175. In some embodiments the bellows 170 is configured to flex as purge liquid volume, and resulting pressure, is applied to increase the biasing force of the seat 25 against the blind 4. In some embodiments the bellows 170 is made from materials which can be welded. In some embodiments bellows 170 comprises INCONEL®, a nickel chromium-based superalloy or a nickel alloy (e.g. a Monel® alloy). In some embodiments bellows 170 are configured with a single spring fold 166, while in some embodiments bellows 170 is configured with multiple spring folds 166; the number of folds is determined by the force required and the amount of desired movement. In some embodiments bellows 170 comprises bellows tabs which overlap with adjacent structures. In some embodiments bellows tabs provide a welding surface wherein the bellows tab is coupled via a welding 171 to the adjacent structure. In some embodiments the adjacent structure comprises the floating seat plate 23. In some embodiments a bellows tab is welded to a packing. In some embodiments, the purge liquid chamber 175 is configured on the surface of the bellows 170 which faces away from the central opening, while in some embodiments the purge liquid chamber 175 is against the bellows surface which faces towards the central opening. In some embodiments purge liquid enters purge liquid chamber 175 through port 185, increasing the volume of purge liquid in the purge liquid chamber 175. In some embodiments the chamber 175 volume increases and the purge liquid cooperatively biases other biasing members such as spring 165 and bellows 170 to increase the biasing force the seat plate 23 places against the seat and the biasing force the seat plate 23 exerts against the blind 4 and the force the seat places against the blind 4. In some embodiments the bellows 170 is a solid sheet of material that is folded and compressed to maintain a bias.

The welding 171 may be formed by any suitable technique including but not limited to electric arc, laser welding, TIG and electron welding to name a few examples. This welding 171 ensures a fluid tight joint or seal between the bellows 170 and the packing so that fluid flow in the valve opening is restricted to between the first and second ports and also that process fluid does not enter into the upper bonnet 33, and lower bonnet 34, or actuator, or escape to the outside environment.

In some embodiments the valve is configured to continuously force purge liquid through the port 185 and purge liquid chamber 175. In some embodiments the liquid purge medium is kept under positive pressure in the valve body to continually force the liquid purge medium out of the valve body and into the valve opening to prevent process fluid from entering the bonnets, purge liquid chamber 175, the port 185, or the valve body 35. In some embodiments the seat plate maintains constant contact and load against the blind 4 to keep sealing surfaces 25 protected. In some embodiments the purge liquid is forced a high pressure through the purge liquid chamber 175, the port 185, or the valve body 35 purge the spaces of any fluid process which may have entered during the stroke. In some embodiments the seat plate 23 is an extended seat plate 197 that maintains constant contact with the blind 4 in all positions through the blind stroke such that all process is captured and not allowed to enter the body chamber 35.

In some embodiments, the packing changes shape as the floating seat plate 23 presses on the packing and radially compresses the packing to improve the seal between the seat plate 23 and the seat body 24. In some embodiments packing cushions the floating seat plate seat body interface 190 to permit seat plate to maintain its degrees of freedom under bias, thus even as the blind 4 thermally expands under the heat and pressure of the heat cycle, the floating seat plate "floats" or articulates to maintain the seal between the seat plate the seat and the blind 4 in a ball/cone and socket manner. In some embodiments the valve comprises two floating seat plates to allow for sufficient axial seat travel upstream and downstream in the opening to balance the sealing load on both sides of the blind 4. In some embodiments the shoulder bolt 199 acts as an axial hard stop on each seat 25 on each side of the blind 4 allowing the upstream seat to maintain its sealing contact with the blind 4.

In some embodiments the extended seat plates 23 on each side of the blind 4 prevent the process fluid from entering the valve body as the valve closes the gate port and exposes the process into the body, typically on other through conduit slab gate valves. In some embodiments extended seat plate 23 are dynamic and spring loaded by the caliper in the bottom of the valve. In some embodiments seat plate 23 are further loaded or biased by a positive pressure purge liquid charge in body cavity when in operation. In some embodiments the purge liquid is taken from downstream where the fluid is pressurized as part of the refining process. In some embodiments a non-pressurized slurry fluid may be taken and pressurized by hydraulic pumps and other known equipment force purge liquid into the chamber 175 to augment the bellows' force and improve the seal between the seat plate 23 and the blind 4. In some embodiments floating seat plate 23 extends beyond the seat 25. In some embodiments floating seat plate 23 is configured to maintain constant contact with the blind such that all process fluid is isolated from the seat and prevented from entering the valve body.

In some embodiments the valve may comprise a sealing system which seals the valve. In some embodiments the sealing system comprises a purge liquid chamber 175. In some embodiments the sealing system 155 further comprises packing configured to improve the seal between the seat plate 23 and the seat body 24. In some embodiments the sealing system comprises the dual dynamic live-loaded floating seating plates which provide bi-directional sealing that seals equally with high pressure from either flange end of the opening.

Some embodiments comprise ports 185, 187 which provides fluid communication between the valve body and the purge liquid chamber 175. In some embodiments purge liquid passes from the valve body through one or both ports 185 or 187 and into the purge liquid chamber 175 to bias the floating seat plate 23 against the blind 4 and seat body 24. Some embodiments comprise ports 185, 187 formed in the seat at the interface 190 between the seat body 24 and the seat plate 23 and a conical seat plate 23 comprising an angled shelf 195 which is configured to create a radial force into the seat body when the seat plate is biased against the seat body. In some embodiments the port 187 further comprises packing configured to improve the seal between the seat body 24 and the seat plate 23. In some embodiments packing comprises graphite, fiber glass, SPECTRA® fibers or carbon nanofibers, carbon nanotubes, extruded nanotubes or another appropriate material.

In some embodiments, the isolation valve 14 is configured to isolate at least one port 185 on a seat 25 from a valve opening, and comprises a blind 4 having a first side 12 and a second side 13; a seat further comprising: an opening; a receiving portion 200 configured to receive the blind, the blind configured to be selectively inserted into the receiving portion 200 intermediate the seat; at least one port 185 formed in the seat; a conical seat plate 23 nested concentrically against the seat body 24 and between the seat and the opening wherein the seat plate 23 is configured to isolate at least one port 185 formed in the seat from the opening wherein the seat plate 23 if further configured to articulate independent of the seat; and a biasing system configured to bias the seat plate 23 against the seat body to isolate the seat from the opening 20. In some embodiments the isolation valve 14 further comprises packing placed at the interface 190 between the conical seat plate 23 and the seat body 24 which packing member 180 deforms as it is compressed radially as the seat plate 23 is biased against the seat. In some embodiments the conical seat plate 23 comprises a shelf 195 with an angled surface which interface 190*s* with the seat and is configured to radially compress the packing as the biasing system is activated. In some embodiments the isolation valve 14 biasing system comprises a spring 165, a bellows 170 and a purge liquid chamber 175 configured to cooperatively work to expand the purge liquid chamber 175 and bias the seat plate 23 and seat against the blind 4 when purge liquid volume of the purge liquid chamber 175 is increased.

Some embodiments teach a method of isolating a purge liquid port from the valve opening comprising: providing a blind 4 having a first side 12 and a second side 13; providing a seat comprising an opening; a receiving portion 200 configured to receive the blind, the blind configured to be selectively inserted into the receiving portion 200 intermediate the seat; at least one port 185 formed in the seat; a conical seat plate 23 nested concentrically against the seat and between the seat and the opening wherein the seat plate 23 is configured to isolate at least one port 185 formed in the seat from the opening wherein the seat plate 23, and further configured to articulate independent of the seat 25; biasing the seat plate 23 against the 23 seat using a biasing system; and compressing a packing member placed at the interface 190 between the conical seat plate 23 and the seat body 24 to substantially isolate the at least one port 185 from the opening.

In some embodiments the method further comprises providing an angled shelf 195 on the seat plate 23 which shelf 195 interfaces with the seat to radially compress the seat as the seat plate 23 is biased against the seat. In some embodiments the method further comprises providing packing at the interface 190 wherein the packing is configured to be compressed radially upon activation of a biasing force against the seat plate 23.

In some embodiments the method further comprises selectively biasing the seat plate 23 against the seat by pressurizing the purge liquid chamber 175 with purge liquid. In some embodiments the method further comprises isolating the valve body from process fluid with a seat plate 23 which extends beyond the seat so that the seat plate 23 scrapes against the seat as the blind moves. Some embodiments perform the steps to the method in a different order, delay performing steps, or eliminate steps all together.

In closing, it is to be understood that the embodiments of the disclosure disclosed herein are illustrative of the principles of the present disclosure. Other modifications that may be employed are within the scope of the disclosure. Thus, by way of example, but not of limitation, alternative configurations of the present disclosure may be utilized in accordance with the teachings herein. Accordingly, the present disclosure is not limited to that precisely as shown and described.

We claim:

1. An isolation valve for controlling a flow of a process fluid, the isolation valve comprising:
   a bonnet;
   a valve body coupled to the bonnet, wherein when the valve body is filled with a liquid purge medium, the liquid purge medium creates a positive pressure to inhibit the process fluid from entering the valve body;
   a blind disposed at least partially within the valve body, the blind coupled to an actuator for actuating the blind between an open configuration and a closed configuration; and
   a seat comprising a purge liquid chamber, wherein when the purge liquid chamber is filled with the liquid purge medium, the purge liquid chamber expands to create a biasing force that presses the seat against the blind, thereby creating a seal between the seat and the blind.

2. The isolation valve of claim 1, wherein the seal between the seat and the blind remains intact while the blind is in the open configuration, while the blind is in the closed configuration, and while the blind is actuating between the open configuration and the closed configuration.

3. The isolation valve of claim 1, wherein the biasing force that presses the seat against the blind is at least 820 PSI.

4. The isolation valve of claim 1, wherein the positive pressure of the liquid purge medium is greater than a pressure of the process fluid.

5. The isolation valve of claim 1, wherein the seat further comprises a bellows disposed within the purge liquid chamber, wherein the bellows expands when the purge liquid chamber is filled with the liquid purge medium, thereby increasing the biasing force that presses the seat against the blind.

6. The isolation valve of claim 5, wherein when the bellows expands, the bellows further seals the purge liquid chamber.

7. The isolation valve of claim 1, wherein the seat further comprises a spring that augments the biasing force that presses the seat against the blind.

8. The isolation valve of claim 1, wherein the seat further comprises a port for delivering the liquid purge medium from the valve body to the purge liquid chamber.

9. The isolation valve of claim 1, wherein the seat further comprises a floating seat plate and a seat body.

10. The isolation valve of claim 9, wherein the seat further comprises a shelf, and packing disposed adjacent to the shelf, wherein the packing is compliant and thereby deforms in response to mechanical forces present as the blind actuates between the open configuration and the closed configuration, consequently allowing for the floating seat plate to articulate in order to maintain the seal between the seat and the blind as the blind actuates between the open configuration and the closed configuration.

11. The isolation valve of claim 10, wherein the shelf is disposed at an angle relative to the blind.

12. The isolation valve of claim 11, wherein the seat further comprises a first port for delivering the liquid purge medium from the valve body to the purge liquid chamber and a second port for delivering the liquid purge medium from the valve body to the purge liquid chamber, wherein the first port is disposed adjacent to the shelf.

13. The isolation valve of claim 1, wherein the process fluid comprises a bottom slurry distilled in a fractionation tower, and the liquid purge medium comprises hydrocarbons distilled in the fractionation tower, the hydrocarbons comprising at least one of: (i) heavy coker oils, (ii) medium coker oils, and (iii) light coker oils.

14. A valve system comprising:
   a valve body;
   a bonnet;
   a blind;
   a seat comprising:
      a seat body;
      a floating seat plate configured to articulate independently of the seat body; and
      a biasing member that creates a seal between the seat and the blind wherein the valve system further comprises a liquid purge medium kept under positive pressure in the valve body to continually force the liquid purge medium out of the valve body and into a valve opening to prevent a process fluid from entering the bonnet or the valve body.

15. The valve system of claim 14, wherein the valve system further comprises a port that is in fluid communication with the valve body.

16. The valve system of claim 15, wherein the biasing member comprises a purge liquid chamber that is in fluid communication with the port, wherein when the purge liquid chamber is filled with a liquid purge medium, the purge liquid chamber expands, creating pressure that biases the floating seat plate against the seat body and against the blind.

17. The valve system of claim 16, wherein the seat further comprises a bellows coupled to floating the seat plate so as to seal the liquid purge medium in the purge liquid chamber.

18. The valve system of claim 16, wherein the seat further comprises a bellows, wherein when the purge liquid chamber expands, the bellows expands, further biasing the floating seat plate against the seat body and against the blind.

19. The valve system of claim 14, further comprising packing inserted into an interface between the floating seat plate and the seat body.

* * * * *